US012679145B2

(12) United States Patent
Kuriyama

(10) Patent No.: US 12,679,145 B2
(45) Date of Patent: Jul. 14, 2026

(54) TIRE

(71) Applicant: The Yokohama Rubber Co., LTD.,
Kanagawa (JP)

(72) Inventor: Masatoshi Kuriyama, Kanagawa (JP)

(73) Assignee: The Yokohama Rubber Co., LTD.,
Tokyo (JP)

( * ) Notice: Subject to any disclaimer, the term of this
patent is extended or adjusted under 35
U.S.C. 154(b) by 57 days.

(21) Appl. No.: 18/252,970

(22) PCT Filed: Nov. 16, 2021

(86) PCT No.: PCT/JP2021/042136
§ 371 (c)(1),
(2) Date: May 15, 2023

(87) PCT Pub. No.: WO2022/107777
PCT Pub. Date: May 27, 2022

(65) Prior Publication Data
US 2024/0001715 A1 Jan. 4, 2024

(30) Foreign Application Priority Data

Nov. 20, 2020 (JP) .................................. 2020-193793

(51) Int. Cl.
*B60C 11/12* (2006.01)
*B60C 11/03* (2006.01)
*B60C 11/01* (2006.01)

(52) U.S. Cl.
CPC ...... *B60C 11/0304* (2013.01); *B60C 11/1204*
(2013.01); *B60C 11/1236* (2013.01);
(Continued)

(58) Field of Classification Search
CPC .. B60C 11/0304; B60C 11/1281; B60C 11/01
See application file for complete search history.

(56) References Cited

U.S. PATENT DOCUMENTS

2007/0272337 A1* 11/2007 Bovaird .............. B60C 11/1218
152/DIG. 3
2010/0294409 A1* 11/2010 Bolzoni .............. B60C 11/1263
152/209.18
(Continued)

FOREIGN PATENT DOCUMENTS

CN 102756616 A 10/2012
DE 10 2016 219 967 A1 4/2017
(Continued)

OTHER PUBLICATIONS

JP 2015-231812 Machine Translation; Mukai, Tomoyuki (Year:
2015).*

*Primary Examiner* — Justin R Fischer
*Assistant Examiner* — Nicholas J Weiler
(74) *Attorney, Agent, or Firm* — Thorpe North & Western

(57) ABSTRACT

A tire includes: main grooves provided in a tread; an
intermediate land provided between a first main groove and
a second main groove from a vehicle outer side; a first sipe
extending through the intermediate land in a width direction;
and a first lug groove open to the first main groove. The first
sipe is bent in the intermediate land. The first sipe includes
a first portion on one side of the bent portion in the width
direction, inclined with respect to a circumferential direc-
tion, and open to the second main groove and a second
portion on the other side of the bent portion in the width
direction, inclined toward a side opposite to the first portion
with respect to the circumferential direction, and open to the
first main groove. Extension lines of the second portion and
a groove center line of the first lug groove are substantially
parallel.

17 Claims, 14 Drawing Sheets

(52) U.S. Cl.
CPC ..... *B60C 11/1281* (2013.01); *B60C 2011/013*
(2013.01); *B60C 2011/0348* (2013.01); *B60C*
*2011/0381* (2013.01); *B60C 2011/1254*
(2013.01)

(56) References Cited

U.S. PATENT DOCUMENTS

| | | | |
|---|---|---|---|
| 2012/0273104 A1 | 11/2012 | Ishida | |
| 2015/0041034 A1* | 2/2015 | Matsushita | B60C 11/0304 |
| | | | 152/209.24 |
| 2016/0152084 A1 | 6/2016 | Murata | |
| 2017/0050470 A1 | 2/2017 | Kanematsu | |
| 2017/0106703 A1 | 4/2017 | Kubo | |
| 2017/0136829 A1* | 5/2017 | Takahashi | B60C 11/13 |
| 2017/0210177 A1* | 7/2017 | Osawa | B60C 11/0306 |
| 2017/0232799 A1* | 8/2017 | Suzuki | B60C 11/1204 |
| | | | 152/209.8 |
| 2018/0015787 A1* | 1/2018 | Hayashi | B60C 11/1369 |
| 2019/0001753 A1* | 1/2019 | Hayashi | B60C 11/0304 |
| 2020/0238766 A1* | 7/2020 | Hamaoka | B60C 11/0304 |
| 2021/0008928 A1 | 1/2021 | Nakazaki | |
| 2021/0039441 A1 | 2/2021 | Horiuchi | |
| 2021/0070107 A1* | 3/2021 | Nashio | B60C 11/12 |
| 2022/0105754 A1* | 4/2022 | Okawara | B60C 11/032 |
| 2022/0118798 A1* | 4/2022 | Nagasawa | B60C 11/1376 |

FOREIGN PATENT DOCUMENTS

| | | | |
|---|---|---|---|
| DE | 11 2019 000 697 T5 | | 10/2020 |
| DE | 11 2019 000 794 T5 | | 11/2020 |
| JP | H09-150608 A | | 6/1997 |
| JP | 11-78433 A | | 3/1999 |
| JP | 2014-181021 A | | 9/2014 |
| JP | 2015231812 A | * | 12/2015 |
| JP | 2017-74842 A | | 4/2017 |
| JP | 2017-124712 A | | 7/2017 |
| JP | 2017-124713 A | | 7/2017 |
| JP | 2017-193337 A | | 10/2017 |
| WO | 2015/011964 A1 | | 1/2015 |
| WO | 2019/156095 A1 | | 8/2019 |
| WO | 2019/159564 A1 | | 8/2019 |

* cited by examiner

TIRE

TECHNICAL FIELD

The present technology relates to a tire.

BACKGROUND ART

For tires, providing wet braking performance and wear resistance performance in a compatible manner is important. The tire disclosed in Japan Unexamined Patent Publication No. 2017-124712 A includes sipes having a bent portion in a land portion on the vehicle outer side from the tire equatorial plane. The tires disclosed in Japan Unexamined Patent Publication Nos. 2017-124713 A and 2017-193337 A include sipes having a bent portion in land portions on both outer sides in the tire width direction from the tire equatorial plane.

However, the tires described in Japan Unexamined Patent Publication Nos. 2017-124712 A, 2017-124713 A and 2017-193337 A have room for improvement in terms of providing wet braking performance and wear resistance performance in a compatible manner.

SUMMARY

In light of the foregoing, the present technology provides a tire that can provide improved wet braking performance and wear resistance performance.

A tire according to an aspect of the present technology includes: at least four main grooves provided in a tread portion; a first intermediate land portion provided between a first main groove that is a primary main groove and a second main groove that is a secondary main groove from a vehicle outer side when mounted on a vehicle; a first sipe provided in the first intermediate land portion and extending through the first intermediate land portion in a tire width direction; and a first lug groove provided in a land portion of the first main groove on the vehicle outer side and open to the first main groove The first sipe is bent in a bent portion provided in the first intermediate land portion. The first sipe includes a first inclined portion provided on one side of the bent portion in the tire width direction, inclined with respect to a tire circumferential direction, and open to the second main groove and a second inclined portion provided on the other side of the bent portion in the tire width direction, inclined with respect to the tire circumferential direction toward a side opposite to the first inclined portion, and open to the first main groove. An extension line of the second inclined portion is substantially parallel with an extension line of a groove center line of the first lug groove.

A difference between an inclination angle of the extension line of the second inclined portion with respect to the tire circumferential direction and an inclination angle of the extension line of the groove center line of the first lug groove with respect to the tire circumferential direction is preferably within ±10 degrees.

Preferably, one end of the first inclined portion opens to the second main groove, the first inclined portion has a first chamfered portion provided in a portion of a side surface on the way toward the bent portion from the one end, and a ratio MW1/SW1 of an extension length MW1 of the first chamfered portion in the tire width direction to an extension length SW1 of the first sipe in the tire width direction is 0.2 or more and 0.4 or less.

A second intermediate land portion provided between a third main groove that is a tertiary main groove and a fourth main groove that is a quaternary main groove from the vehicle outer side when mounted on the vehicle and a second sipe provided in the second intermediate land portion and extending in the tire circumferential direction may be included. One end of the second sipe may open to the fourth main groove, and the other end of the second sipe may terminate in the second intermediate land portion. The second sipe may be bent on the way toward the other end from the one end. The second sipe may have a second chamfered portion provided in a portion of a side surface on the way toward the other end from the one end.

A ratio SW2/L2 of an extension length SW2 of the second sipe in the tire width direction to a land portion width L2 of the second intermediate land portion is preferably 0.5 or more and 0.7 or less.

A ratio MW2/SW2 of an extension length MW2 of the second chamfered portion in the tire width direction to an extension length SW2 of the second sipe in the tire width direction is preferably 0.4 or more and 0.6 or less.

A third intermediate land portion provided between a second main groove that is a secondary main groove and a third main groove that is a tertiary main groove from the vehicle outer side when mounted on the vehicle and a third sipe provided in the third intermediate land portion and extending in the tire circumferential direction may be included. One end of the third sipe may open to the third main groove, and the other end of the third sipe may terminate in the third intermediate land portion. The third sipe may be bent on the way toward the other end from the one end. The third sipe may have a second chamfered portion on both side surfaces on the way toward the other end from the one end.

A ratio SW3/L3 of an extension length SW3 of the third sipe in the tire width direction to a land portion width L3 of the third intermediate land portion is preferably 0.3 or more and 0.5 or less.

An inner shoulder land portion provided on a vehicle inner side of a fourth main groove that is a quaternary main groove from the vehicle outer side when mounted on the vehicle, an inner shoulder lug groove provided in the inner shoulder land portion and extending in the tire width direction, and an inner shoulder sipe having one end connected to the inner shoulder lug groove and the other end connected to the fourth main groove may be included.

Preferably, the inner shoulder lug groove has a bent portion at a position on the vehicle inner side of a connection portion with the inner shoulder lug groove, and an extension direction of a portion of the inner shoulder lug groove on the vehicle inner side of the bent portion is different from an extension direction of the inner shoulder sipe.

A dimple provided on an outer side in the tire width direction of a ground contact edge of the inner shoulder land portion may be included.

An outer shoulder land portion provided on the vehicle outer side of the first main groove that is a primary main groove from the vehicle outer side when mounted on the vehicle, an outer shoulder lug groove provided in the outer shoulder land portion, extending in the tire width direction, and having one end terminating at the outer shoulder land portion, and an outer shoulder sipe provided in the outer shoulder land portion, extending in the tire width direction, and having one end terminating at the outer shoulder land portion may be included.

The outer shoulder lug groove and the outer shoulder sipe may be alternately provided in the tire circumferential direction.

A dimple provided on an outer side in the tire width direction of a ground contact edge of the outer shoulder land portion may be included.

A third intermediate land portion provided between the second main groove that is the secondary main groove and the third main groove that is the tertiary main groove from the vehicle outer side when mounted on the vehicle, a third sipe provided in the third intermediate land portion and extending in the tire circumferential direction may be included. A ratio SW1/L1 of an extension length SW1 of the first sipe in the tire width direction to a land portion width L1 of the first intermediate land portion L1, a ratio SW2/L2 of an extension length SW2 of the second sipe in the tire width direction to a land portion width L2 of the second intermediate land portion, and a ratio SW3/L3 of an extension length SW3 of the third sipe in the tire width direction to a land portion width L3 of the third intermediate land portion may satisfy a relationship of the ratio SW1/L1>the ratio SW2/L2>the ratio SW3/L3.

A mounting direction indicator configured to indicate that the tire is to be mounted on the vehicle such that a vehicle inner side region when mounted on the vehicle is placed on an inner side in the vehicle width direction may be included.

The tire according to the present technology has an effect of improving the wet braking performance and wear resistance performance.

DETAILED DESCRIPTION

Figure 1:
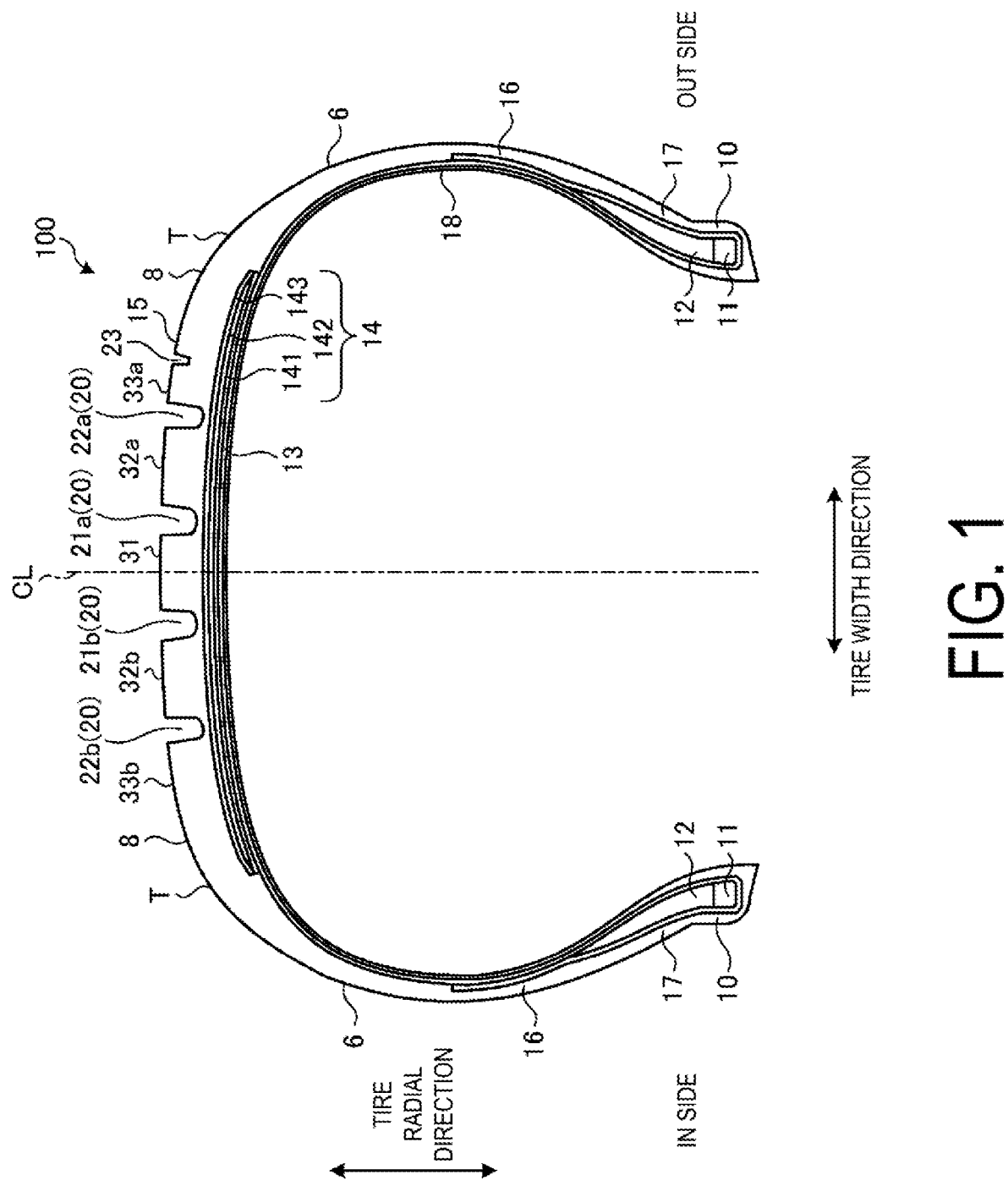
FIG. 1 is a meridian cross-sectional view of a tire according to the present embodiment.
Figure 2:
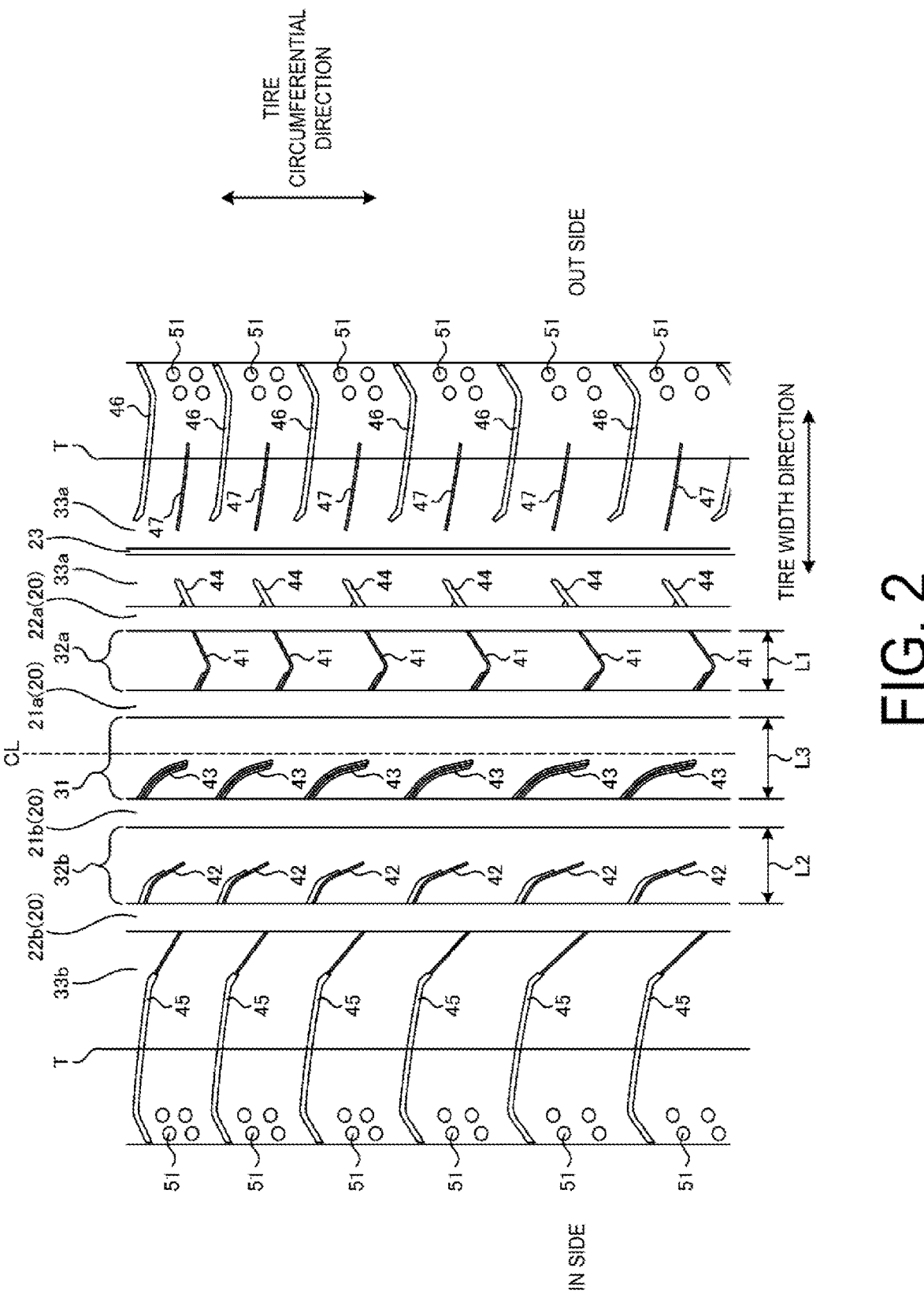
FIG. 2 is a plan view illustrating a tread surface of the tire according to the present embodiment.

Embodiments of the present technology will be described in detail below with reference to the drawings. In the embodiments described below, identical or similar components to those of other embodiments have identical reference signs, and descriptions of those components will be either simplified or omitted. The present technology is not limited by the embodiments. Constituents of the embodiments include elements that are substantially identical or that can be substituted and easily conceived by one skilled in the art. The configurations described below can be combined as desired. Moreover, various omissions, substitutions, and changes to the configurations can be carried out within the scope of the present technology.
Tire FIG. 1 is a meridian cross-sectional view of a tire 100 according to the present embodiment. FIG. 2 is a plan view of a tread surface of the tire 100 according to the present embodiment. The tire 100 according to the present embodiment is preferably a pneumatic tire. Inert gases, such as nitrogen, argon, and helium, in addition to ordinary air or air with an oxygen partial pressure adjusted can be used as the gas to be filled in the tire 100.

In the following description, the meridian cross-section of the tire refers to a cross-section when a tire is cut on a plane including a tire rotation axis (not illustrated) of the tire. A tire radial direction refers to the direction orthogonal to the rotation axis (not illustrated) of the tire 100, an inner side in the tire radial direction refers to the side toward the rotation axis in the tire radial direction, an outer side in the tire radial direction refers to the side away from the rotation axis in the tire radial direction. A tire circumferential direction refers to a circumferential direction about the rotation axis as a center axis. A tire width direction refers to a direction parallel with the rotation axis, an inner side in the tire width direction refers to a side toward a tire equatorial plane (tire equator line) CL in the tire width direction, and an outer side in the tire width direction refers to a side away from the tire equatorial plane CL in the tire width direction. A tire equatorial plane CL refers to a plane that is orthogonal to the rotation axis of the tire 100 and passes through the center of the tire width of the tire 100. A tire width is a width in the tire width direction between portions located on outer sides in the tire width direction, in other words, a distance between portions that are most distant from the tire equatorial plane CL in the tire width direction. A tire equator line refers to a line along the tire circumferential direction of the tire 100 on the tire equatorial plane CL. In the present embodiment, the tire equator line is denoted by the same reference sign CL as the tire equatorial plane.

In FIGS. 1 and 2, the reference signs T, T denote ground contact edges. The ground contact edges refer to both outermost edges in the tire width direction in a region in which a tread surface 3 of a tread portion 2 of the tire 100 contacts the road surface when the tire 100 is mounted on a specified rim, inflated to a specified internal pressure, and loaded with 70% of a specified load. The ground contact edges are continuous in the tire circumferential direction.

Here, a specified rim refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Moreover, the specified internal pressure refers to a "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. The specified internal pressure is, for example, 250 kPa.

A plurality of circumferential main grooves 20 extending in the tire circumferential direction is provided in the tread surface 3. The plurality of circumferential main grooves 20 includes center main grooves 21a and 21b closest to the tire equatorial plane CL and shoulder main grooves 22a and 22b provided on the outer sides of the center main grooves 21a and 21b in the tire width direction. The center main groove 21a is sometimes referred to as an outer center main groove. The center main groove 21b is sometimes referred to as an inner center main groove. The shoulder main groove 22a is sometimes referred to as an outer shoulder main groove. The shoulder main groove 22b is sometimes referred to as an inner shoulder main groove. A plurality of land portions 31, 32a, 32b, 33a, and 33b is defined by these four circumferential main grooves 20.

The land portion 31 is a land portion provided between a second main groove that is a secondary main groove, that is, the center main groove 21a from the vehicle outer side (the OUT side in the drawing) when mounted on the vehicle and a third main groove that is a tertiary main groove, that is, the center main groove 21b. The land portion 32a is a land portion provided between a first main groove that is a primary main groove, that is, the shoulder main groove 22a from the vehicle outer side when the tire 100 is mounted on the vehicle and a second main groove that is a secondary main groove, that is, the center main groove 21a. The land portion 32b is a land portion provided between a third main groove that is a tertiary main groove, that is, the center main groove 21b from the vehicle outer side when the tire 100 is mounted on the vehicle and a fourth main groove that is a quaternary main groove, that is, the shoulder main groove 22b.

The land portion 31 is sometimes referred to as a center land portion or a third intermediate land portion. The land portion 32a provided on the vehicle outer side of the center land portion 31 is sometimes referred to as a first intermediate land portion, and the land portion 32b provided on the vehicle inner side of the center land portion 31 is sometimes referred to as a second intermediate land portion. The land portion 33a is sometimes referred to as an outer shoulder land portion, and the land portion 33b is sometimes referred to as an inner shoulder land portion. A shoulder narrow groove 23 is provided in the outer shoulder land portion 33a. The shoulder narrow groove 23 extends in the tire circumferential direction. The shoulder narrow groove 23 is sometimes referred to as a circumferential narrow groove.

The tire 100 has an annular structure with the tire rotation axis being as the center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17.

The pair of bead cores 11, 11 include one or a plurality of bead wires made of steel and wound annularly multiple times and are embedded in bead portions 10 to configure the cores of the left and right bead portions 10. The pair of bead fillers 12, 12 are disposed on the outer side in the tire radial direction of the pair of bead cores 11, 11 to reinforce the bead portions 10.

The carcass layer 13 has a single layer structure including one carcass ply or a multilayer structure including a plurality of carcass plies layered, extends in a toroidal shape between the left and right bead cores 11, 11, and constitutes the backbone of the tire. Both end portions of the carcass layer 13 are turned back toward outer sides in the tire width direction and fixed to wrap the bead cores 11 and the bead fillers 12. The carcass ply of the carcass layer 13 is made by covering a plurality of carcass cords made of steel or an organic fiber material (for example, aramid, nylon, polyester, or rayon) with a coating rubber and performing a rolling process on the carcass cords and has a cord angle of 80 degrees or more and 100 degrees or less. The cord angle is defined as the inclination angle in the longitudinal direction of the carcass cord with respect to the tire circumferential direction.

In the configuration of FIG. 1, the carcass layer 13 has a single layer structure including a single carcass ply, and a turned back portion 132 thereof extends along the outer circumferential surface of a body portion 131. A terminating end portion of the turned back portion 132 is sandwiched between the belt layer 14 and the body portion 131.

The belt layer 14 is formed by layering a plurality of belt plies, and is disposed around the outer circumference of the carcass layer 13. The belt layer 14 includes a pair of cross belts 141 and 142 and a belt cover 143. In this example, a plurality of the belt covers 143 is provided.

The pair of cross belts 141, 142 are made by covering a plurality of belt cords made of steel or an organic fiber material with a coating rubber and performing a rolling process on the belt cords and have a cord angle of 15 degrees or more and 55 degrees or less as an absolute value. Further, the pair of cross belts 141, 142 have cord angles (defined as inclination angles in longitudinal directions of the belt cords with respect to the tire circumferential direction) of mutually opposite signs and are layered such that the longitudinal directions of the belt cords intersect each other (so-called crossply structure). Furthermore, the pair of cross belts 141, 142 are disposed in a layered manner on an outer side in the tire radial direction of the carcass layer 13.

The belt cover 143 is made by covering belt cover cords made from steel or an organic fiber material with a coating rubber and has a cord angle, as an absolute value, of 0 degrees or more and 10 degrees or less. The belt cover 143 is, for example, a strip material formed by covering one or a plurality of belt cover cords with a coating rubber, where the strip material is formed by winding the strip material on the outer circumferential surfaces of the cross belts 141 and 142 multiple times and spirally in the tire circumferential direction. Furthermore, the belt cover 143 is disposed to cover the entire region of the cross belts 141, 142.

The tread rubber 15 is disposed in the outer circumferences of the carcass layer 13 and the belt layer 14 in the tire radial direction and constitutes a tread portion 2 of the tire. Shoulder portions 8 are located at both end portions of the tread portion 2 in the tire width direction. The pair of sidewall rubbers 16, 16 are each disposed on an outer side of the carcass layer 13 in the tire width direction and constitute left and right sidewall portions 6.

The pair of rim cushion rubbers 17, 17 extend from an inner side in the tire radial direction of the left and right bead cores 11, 11 and the turned back portions 132 of the carcass layer 13 toward the outer side in the tire width direction and constitute rim fitting surfaces of the bead portions 10. The rim fitting surface is a contact surface of the bead portion 10 with the rim flange (not illustrated).

The innerliner 18 is an air penetration preventing layer disposed on the tire inner surface and covering the carcass layer 13, suppresses oxidation caused by exposure of the carcass layer 13, and prevents leaking of the air in the tire. Additionally, the innerliner 18 is made of, for example, a rubber composition containing butyl rubber as a main component, a thermoplastic resin, and a thermoplastic elastomer composition containing an elastomer component blended with a thermoplastic resin.

Note that the internal structure of the tire 100 described above represents a typical example for the tire 100 and that the internal structure is not limited thereto.

Tread Portion

The tread portion 2 will be described in detail below. In the following description, a groove width is measured as a distance between groove walls opposed in a groove opening portion when the tire is mounted on a specified rim, inflated to a specified internal pressure, and in an unloaded state. In a configuration in which the groove opening portion includes a notch portion or a chamfered portion, the groove width is measured by using, as measurement points, intersection points of an extension line of a tread contact surface and extension lines of the groove walls, in a cross-sectional view parallel to a groove width direction and a groove depth direction. The groove depth is measured as a distance from the tread contact surface to a groove bottom when the tire is mounted on a specified rim, inflated to a specified internal pressure, and in an unloaded state. In a configuration in which a groove bottom includes, on part thereof, a raised bottom portion and or a recess/protrusion portion, the groove depth is measured excluding the raised bottom portion and the recess/protrusion portion.

As illustrated in FIG. 2, a plurality of circumferential main grooves 20 that extend in the tire circumferential direction is provided in the tread portion 2. Two circumferential main grooves 20 are disposed on each of outer sides of the tire equatorial plane CL in the tire width direction. On the vehicle outer side, the circumferential main groove 20 closer to the tire equatorial plane CL is referred to as an outer center main groove (may also be referred to as a center main groove) 21a, and the circumferential main groove 20 on the outer side of the outer center main groove 21a in the tire width direction is referred to as an outer shoulder main groove (may also be referred to as a shoulder main groove) 22a. On the vehicle inner side, the circumferential main groove 20 closer to the tire equatorial plane CL is referred to as an inner center main groove (may also be referred to as a center main groove) 21b, and the circumferential main groove 20 on the outer side of the inner center main groove 21b in the tire width direction is referred to as an inner shoulder main groove (may also be referred to as a shoulder main groove) 22b.

A main groove refers to a groove on which a wear indicator must be provided as specified by JATMA and has a groove width of 5.0 mm or more and 12 mm or less and a groove depth of 5.0 mm or more. A lug groove described below refers to a lateral groove extending in a tire width direction, has a groove width of 2.0 mm or more and 4.0 mm or less and a groove depth of 3.0 mm or more, and opens when the tire comes into contact with the ground to function as a groove. A sipe described below is a notch formed in the tread contact surface and has a groove width of 1.0 mm or more and 2.0 mm or less and a groove depth of 3.0 mm or more and 5.0 mm or less. The sipe is closed when the tire comes into contact with the ground.

At both end portions of each land portion in the tire width direction, that is, the boundary portions between the land portion and the main groove 20, a chamfer continuous in the tire circumferential direction may be provided. When the chamfer is provided, the width of the land portion, the width of the groove, the length of the groove, and the like are measured by imagining the shape of the land portion without the chamfer.

First Intermediate Land Portion

Figure 3:
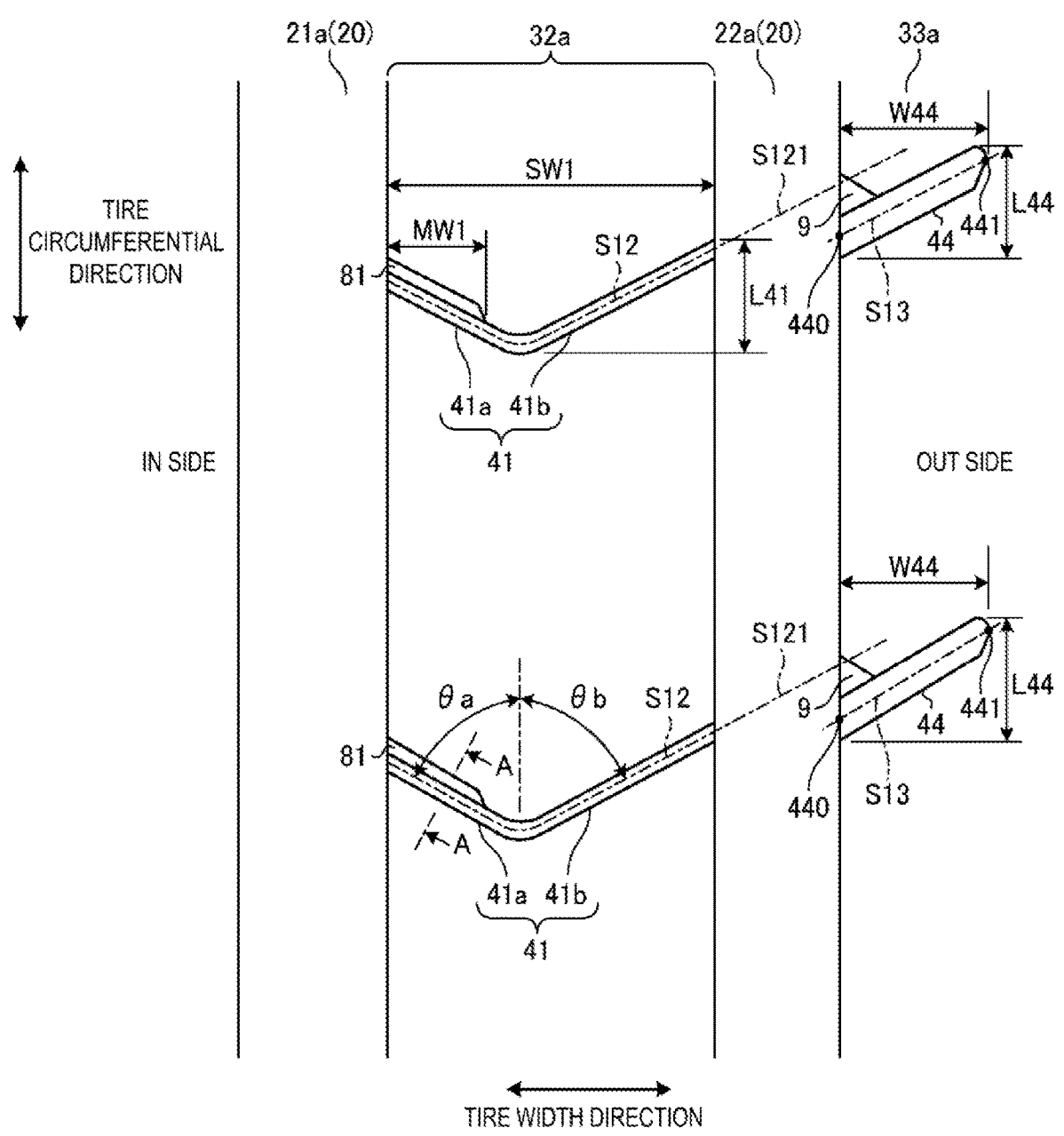
FIG. 3 is an enlarged view of a first intermediate land portion in FIG. 2.

FIG. 3 is an enlarged view of the first intermediate land portion 32a in FIG. 2. As illustrated in FIG. 3, a sipe 41 (first sipe) is provided in the first intermediate land portion 32a. A plurality of Sipes 41 is provided side by side in the tire circumferential direction. The sipe 41 extends in the tire width direction and in the tire circumferential direction. The sipe 41 extends through the first intermediate land portion 32a. That is, one end of the sipe 41 opens to the center main groove 21a, and the other end of the sipe 41 opens to the outer shoulder main groove 22a. The dot-dash line in FIG. 3 is a groove center line of the sipe 41.

The ratio L41/SW1 of an extension length L41 of the sipe 41 in the tire circumferential direction to an extension length SW1 of the sipe 41 in the tire width direction is preferably 0.2 or more and 0.4 or less. The ratio L41/SW1 within this range allows wet braking performance and wear resistance performance to be improved. In this example, the extension length SW1 of the sipe 41 in the tire width direction is the same as the length of the first intermediate land portion 32a in the tire width direction, that is, the land portion width L1, and the ratio SW1/L1 is equal to 1.

The sipe 41 is bent in the first intermediate land portion 32a. The sipe 41 includes a first inclined portion 41a inclined to one side with respect to the tire circumferential direction and a second inclined portion 41b inclined to the other side with respect to the tire circumferential direction. The first inclined portion 41a is inclined to the left side (IN side, that is, the vehicle inner side) in FIG. 3 with respect to the tire circumferential direction from the lower side to the upper side in FIG. 3. The second inclined portion 41b is inclined to the right side in FIG. 3 (the OUT side, that is, the vehicle outer side) with respect to the tire circumferential direction from the lower side to the upper side in FIG. 3. That is, the first inclined portion 41a and the second inclined portion 41b are inclined in mutually opposite directions with respect to the tire circumferential direction. The inclination angle θa of the first inclined portion 41a with respect to the tire circumferential direction is preferably 30 degrees or more and 80 degrees or less. The inclination angle θb of the second inclined portion 41b with respect to the tire circumferential direction is preferably 30 degrees or more and 80 degrees or less.

The first inclined portion 41a has a chamfered portion 81 (first chamfered portion). The chamfered portion 81 is provided on one side of the first inclined portion 41a in the groove width direction. The ratio MW1/SW1 of an extension length MW1 of the chamfered portion 81 in the tire width direction to an extension length SW1 of the first intermediate land portion 32a in the tire width direction is preferably 0.2 or more and 0.4 or less. The ratio MW1/SW1 within this range allows the wet braking performance and the wear resistance performance to be improved.

Cross-Sectional Shape of First Chamfered Portion

Figure 4:
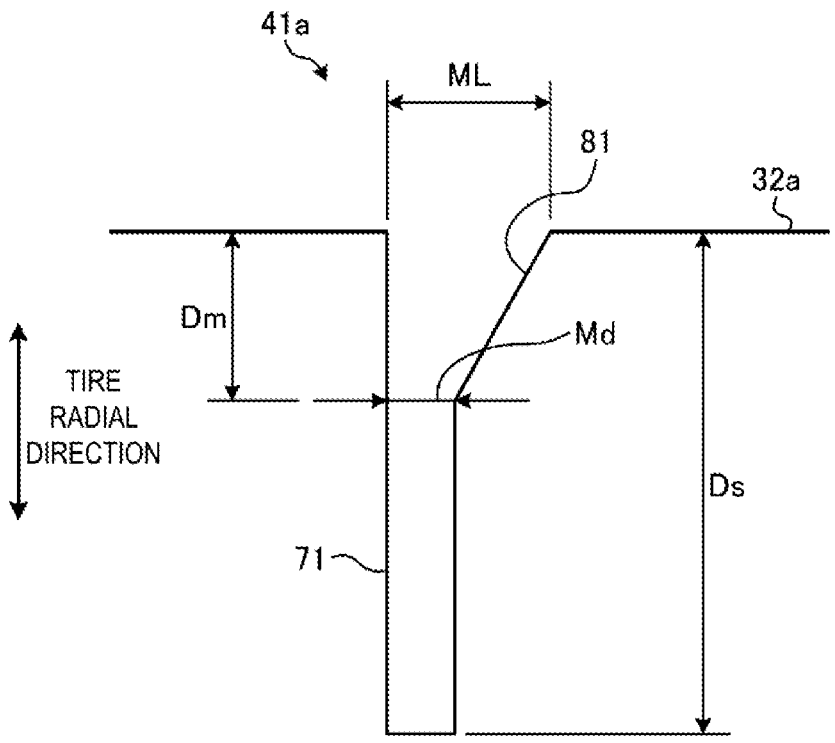
FIG. 4 is a view illustrating an example of a cross-sectional shape of a chamfered portion in FIG. 3.

FIG. 4 is a view illustrating an example of a cross-sectional shape of the chamfered portion 81 in FIG. 3. FIG. 4 is a cross-sectional view along a line A-A in FIG. 3. As illustrated in FIG. 4, the first inclined portion 41a of the sipe 41 includes a body portion 71 extending from the tread surface of the first intermediate land portion 32a in the tire radial direction, that is, the groove depth direction, and a chamfered portion 81 provided in an opening portion of the body portion 71 to the first intermediate land portion 32a.

In FIG. 4, the depth of the body portion 71 including the depth of the chamfered portion 81 is Ds, the depth of the chamfered portion 81 (the depth of the maximum depth portion) is Dm, the groove depth of the circumferential main groove 20 is D, and the depths satisfy a relationship D>Ds>Dm. Such a relationship in depth allows block rigidity to be maintained to improve the wear resistance performance as well as the wet braking performance.

The depth of the circumferential main groove 20 is, for example, 4 mm or more and 8 mm or less. The depth Ds of the body portion 71 including the depth of the chamfered portion 81 is, for example, 3 mm or more and 6 mm or less. The depth (depth of the maximum depth portion) Dm of the chamfered portion 81 is, for example, 1 mm or more and 2 mm or less.

The width of the tread surface of the first intermediate land portion 32$a$ in the direction orthogonal to the extension direction of the body portion 71, that is, the width ML including the chamfered portion 81 is preferably 2.0 mm or more and 5.0 mm or less. The depth of the chamfered portion 81 is preferably 1.0 mm or more and 3.0 mm or less. With respect to the depth Dm of the chamfered portion 81, the width ML satisfies ML>Dm. The width ML of the chamfered portion 81 becomes narrower toward a maximum depth portion Md. Such a relationship in depth allows block rigidity to be maintained to improve the wet braking performance and the wear resistance performance.

Figure 5:
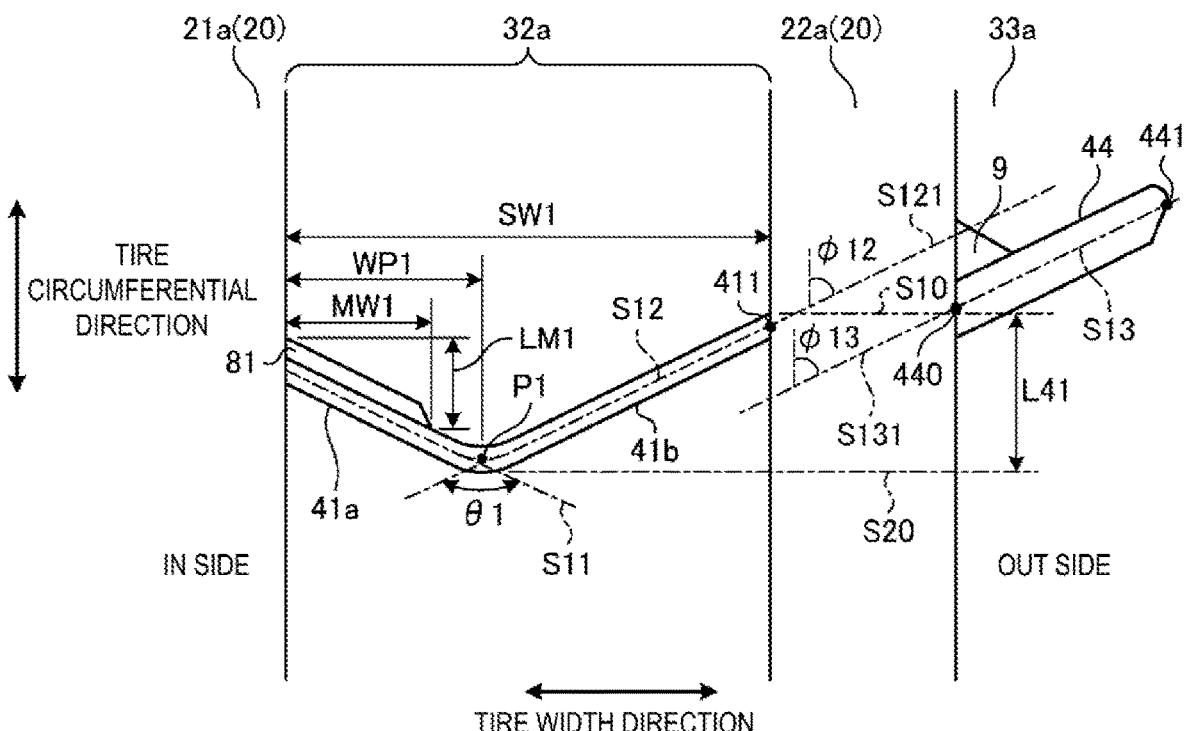
FIG. 5 is an enlarged view illustrating part of FIG. 3.

FIG. 5 is an enlarged view illustrating part of FIG. 3. As illustrated in FIG. 5, the bend point of the sipe 41 is defined as P1. The chamfered portion 81 terminates between the opening portion of the first inclined portion 41$a$ of the sipe 41 to the main groove 21$a$ and the bend point P1. The ratio MW1/WP1 of an extension length MW1 of the chamfered portion 81 in the tire width direction to the length WP1 from the opening portion of the first inclined portion 41$a$ to the main groove 21$a$ to the bend point P1 is preferably 0.5 or more and 0.9 or less. The ratio MW1/WP1 within this range allows the wet braking performance and the wear resistance performance to be improved.

The ratio LM1/MW1 of an extension length LM1 of the chamfered portion 81 in the tire circumferential direction to an extension length MW1 of the chamfering portion 81 in the tire width direction is preferably 0.3 or more and 0.8 or less. The ratio LM1/MW1 within this range allows the wet braking performance and the wear resistance performance to be improved.

An angle $\theta$1 between the center line S11 of the first inclined portion 41$a$ and the center line S12 of the groove width of the second inclined portion 41$b$ is preferably 60 degrees or more and 160 degrees or less. The angle $\theta$1, which is the bend angle of the sipe 41, within this range allows the block rigidity to be maintained and the wet braking performance and the wear resistance performance to be improved.

Relationship Between Sipe of First Intermediate Land Portion and Lug Groove of Outer Shoulder Land Portion Returning to FIG. 3, a lug groove 44 is provided in the outer shoulder land portion 33$a$. The lug groove 44 extends in the tire width direction and the tire circumferential direction. One end of the lug groove 44 opens to the outer shoulder main groove 22$a$ at an opening portion 440, and the other end of the lug groove 44 terminates at a terminating end portion 441 within the outer shoulder land portion 33$a$. The lug groove 44 and the second inclined portion 41$b$ are provided at positions facing each other with the outer shoulder main groove 22$a$ interposed therebetween. A notch portion 9 is provided in the opening portion 440 of the lug groove 44 to the outer shoulder main groove 22$a$. The notch portion 9 is provided on an extension line S121 of the center line S12 of the second inclined portion 41$b$.

The ratio L44/W44 of an extension length L44 of the lug groove 44 in the tire circumferential direction to an extension length W44 of the lug groove 44 in the tire width direction is more preferably 0.4 or more and 0.8 or less. The ratio L44/W44 within this range allows the wet braking performance and the wear resistance performance to be improved.

As illustrated in FIG. 5, the opening portion 440 of the lug groove 44 is positioned within the range of the extension length L41 of the lug groove 44 in the tire circumferential direction. Such a positional relationship allows the drainage performance to be ensured and the wet braking performance and the wear resistance performance to be improved.

As illustrated in FIG. 5, the extension line S121 of the center line S12 of the second inclined portion 41$b$ and the extension line S131 of the groove width center line S13 of the lug groove 44 are substantially parallel. "Substantially parallel" means that the difference between the inclination angle $\varphi$12 of the extension line S121 and the inclination angle $\varphi$13 of the extension line S131 with respect to the tire circumferential direction is within ±10 degrees. The inclination angle $\varphi$2 and the inclination angle $\varphi$3 having such a positional relationship allows the drainage performance to be ensured and the wet braking performance and the wear resistance performance to be improved.

If the second inclined portion 41$b$ is curved, the extension line S121 is an extension line of an imaginary line connecting the bend point P1 and the opening portion 411 of the second inclined portion 41$b$ to the outer shoulder main groove 22$a$ with a straight line. If the lug groove 44 is curved, the extension line S131 is an extension line of an imaginary line connecting the terminating end portion 441 of the lug groove 44 and the opening portion 440 with a straight line.

Second Intermediate Land Portion

Figure 6:
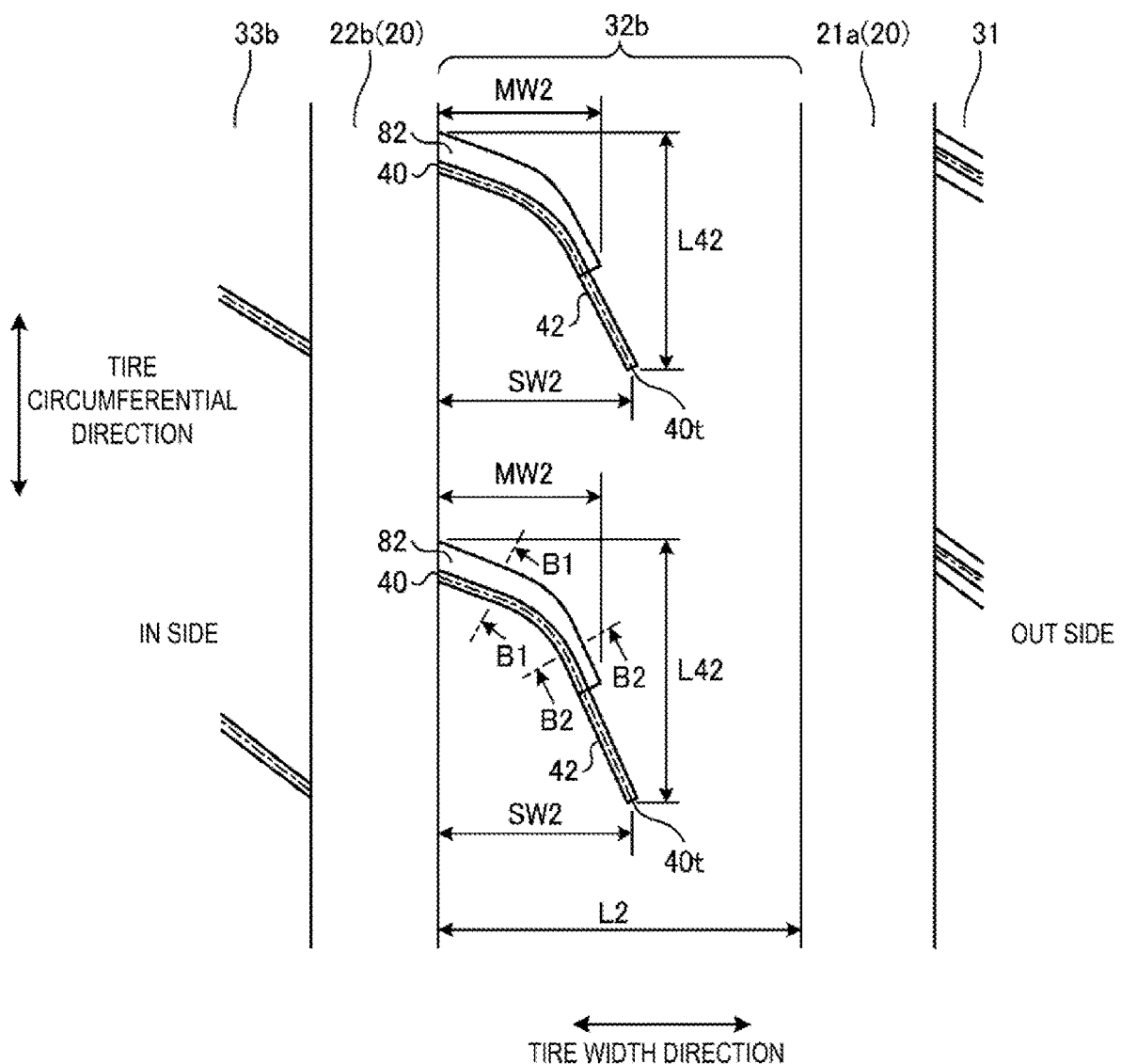
FIG. 6 is an enlarged view of a second intermediate land portion in FIG. 2.

FIG. 6 is an enlarged view of the second intermediate land portion 32$b$ in FIG. 2. As illustrated in FIG. 6, a sipe 42 (second sipe) is provided in the second intermediate land portion 32$b$. A plurality of second sipes 42 is provided side by side in the tire circumferential direction. The sipe 42 is bent in the second intermediate land portion 32$b$. When the opening portion 40 of the sipe 42 to the shoulder main groove 22$b$ is used as a reference, the sipe 42 is inclined from the position of the opening portion 40 toward the lower right in FIG. 6. Therefore, the sipe 42 extends in the tire width direction and the tire circumferential direction. The sipe 42 does not extend through the second intermediate land portion 32$b$. That is, one end of the sipe 42 opens to the shoulder main groove 22$b$, and the other end of the sipe 42 terminates within the second intermediate land portion 32$b$. The sipe 42 does not extend through the second intermediate land portion 32$b$. The dot-dash line in FIG. 6 is a groove center line of the sipe 42.

The ratio SW2/L2 of the extension length SW2 of the sipe 42 in the tire width direction to the length of the second intermediate land portion 32$b$ in the tire width direction, that is, the land portion width L2 is preferably 0.5 or more and 0.7 or less. The ratio SW2/L2 within this range allows the wet braking performance and the wear resistance performance to be improved.

The ratio L42/SW2 of an extension length L42 of the sipe 42 in the tire circumferential direction to an extension length SW2 of the sipe 42 in the tire width direction is preferably 0.5 or more and 0.7 or less. The ratio L42/SW2 within this range allows the wet braking performance and the wear resistance performance to be improved.

The sipe 42 has a chamfered portion 82 (second chamfered portion). The chamfered portion 82 is provided on one side of the sipe 42 in the groove width direction. The ratio MW2/SW2 of an extension length MW2 of the chamfered portion 82 in the tire width direction to an extension length SW2 of the sipe 42 in the tire width direction is preferably 0.4 or more and 0.6 or less. The ratio MW2/SW2 within this range allows the wet braking performance and the wear resistance performance to be improved.

Cross-Sectional Shape of Second Chamfered Portion

Figure 7:
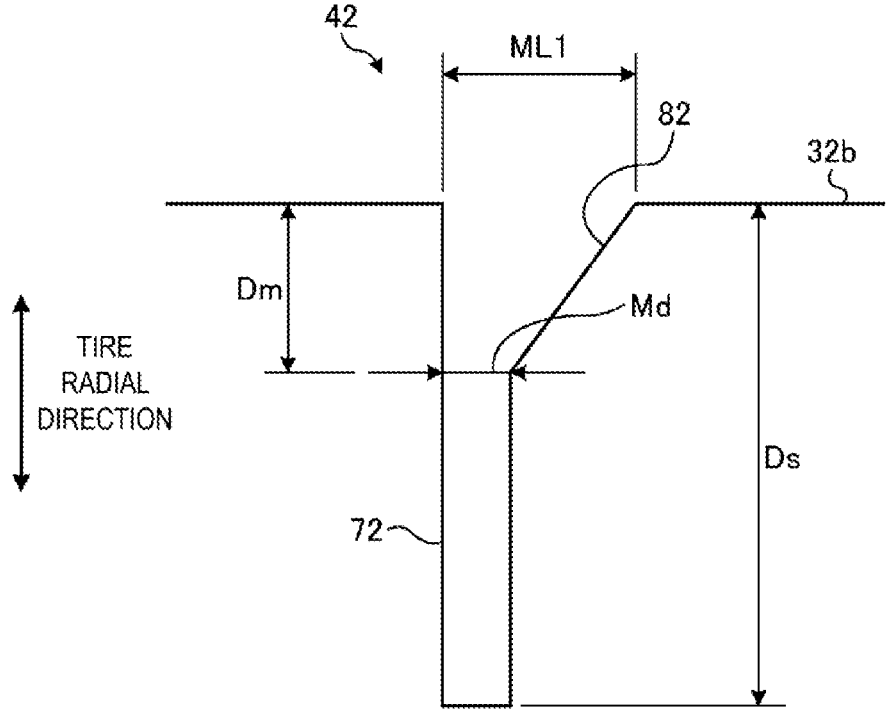
FIG. 7 is a view illustrating an example of a cross-sectional shape of a chamfered portion in FIG. 6.
Figure 8:
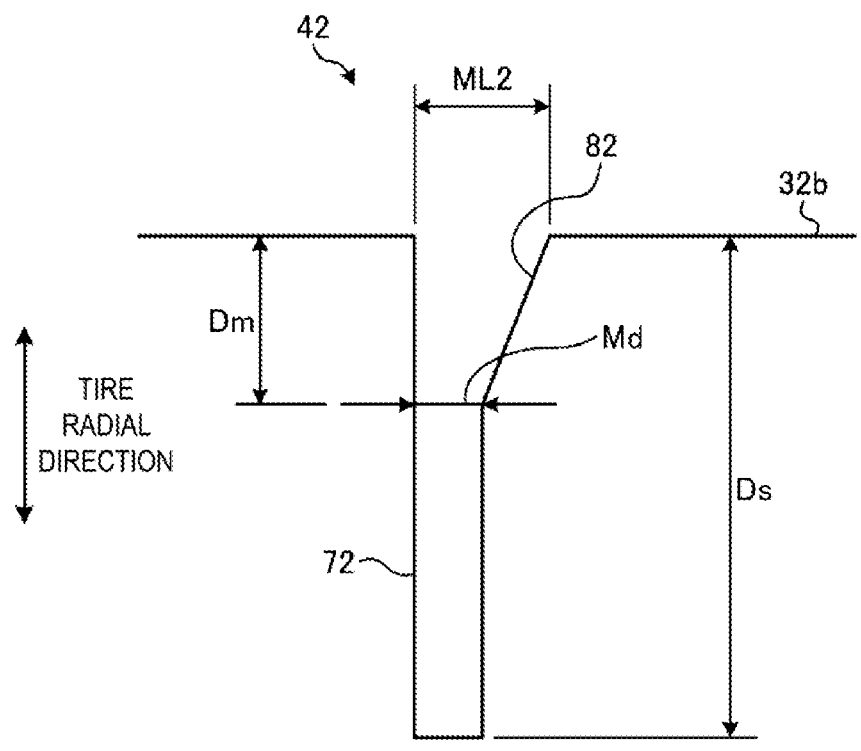
FIG. 8 is a view illustrating an example of a cross-sectional shape of a chamfered portion in FIG. 6.

FIGS. 7 and 8 are views illustrating an example of a cross-sectional shape of the chamfered portion 82 in FIG. 6.

FIG. 7 is a cross-sectional view along a line B1-B1 near the opening portion 40 of the sipe 42 in FIG. 6. FIG. 8 is a cross-sectional view along a line B2-B2 in FIG. 6. As illustrated in FIGS. 7 and 8, the sipe 42 includes a body portion 72 extending from the tread surface of the second intermediate land portion 32*b* in the tire radial direction, that is, the groove depth direction and a chamfered portion 82 provided at the opening portion of the body portion 72 to the second intermediate land portion 32*b*.

In FIGS. 7 and 8, the depth of the body portion 72 including the depth of the chamfered portion 82 is Ds, the depth of the chamfered portion 82 (the depth of the maximum depth portion) is Dm, the groove depth of the circumferential main groove 20 is D, and the depths satisfy a relationship D>Ds>Dm. Such a relationship in depth allows block rigidity to be maintained to improve the wear resistance performance as well as the wet braking performance.

The depth Ds of the body portion 72 including the depth of the chamfered portion 82 is, for example, 3 mm or more and 6 mm or less. The depth (depth of the maximum depth portion) Dm of the chamfered portion 82 is, for example, 1 mm or more and 2 mm or less.

In FIG. 7, the width of the tread surface of the second intermediate land portion 32*b* in the direction orthogonal to the extension direction of the body portion 72, that is, the width including the chamfered portion 82 is defined as ML1. In FIG. 8, the width of the tread surface of the second intermediate land portion 32*b* in the direction orthogonal to the extension direction of the body portion 72, that is, the width including the chamfered portion 82 is defined as ML2. The width ML1 of the sipe 42 near the opening portion 40 is larger than the width ML2 of the sipe 42 near a terminating end portion 40*t*. The widths ML1 and ML2 including the chamfered portion 82 having such a relationship allows drainage performance to be maintained and wet braking performance to be improved.

Figure 9:
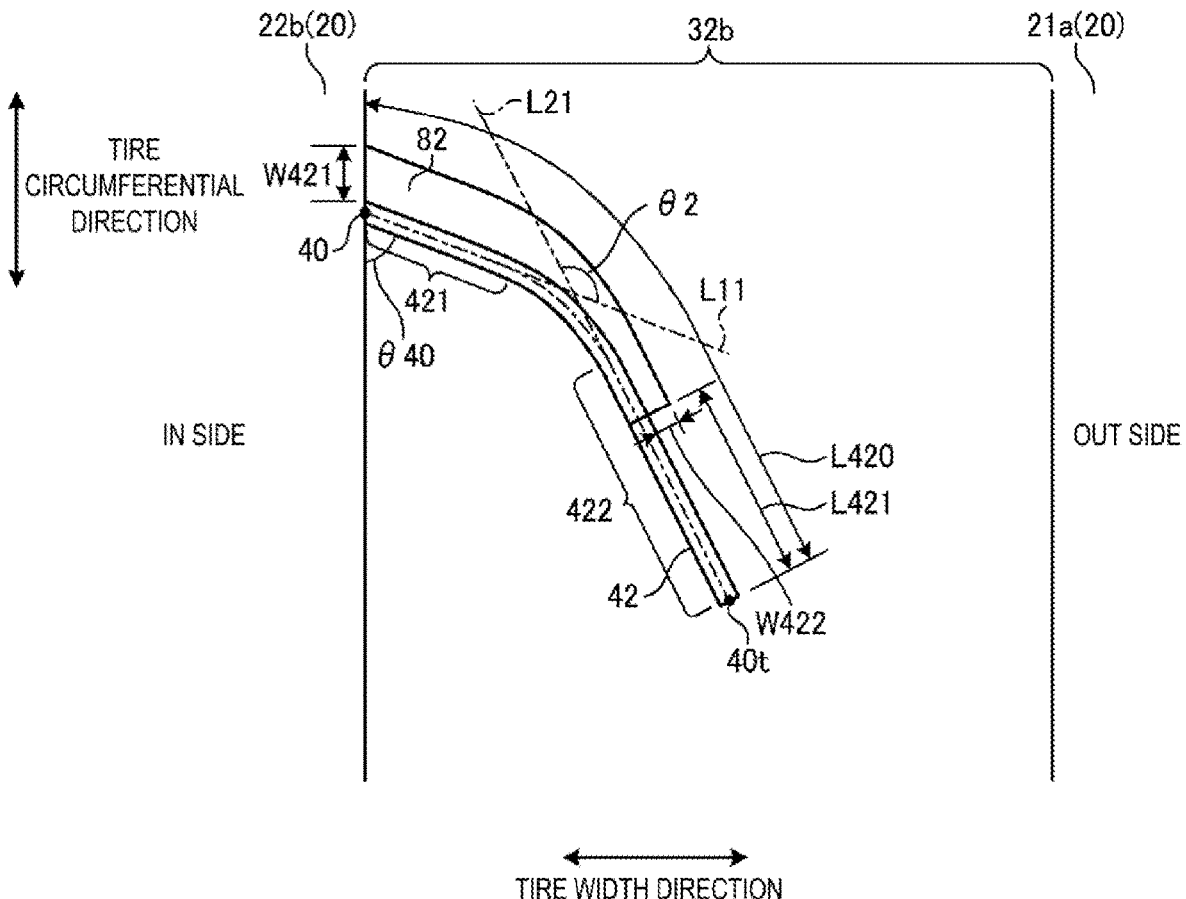
FIG. 9 is an enlarged view illustrating part of FIG. 6.

FIG. 9 is an enlarged view illustrating part of FIG. 6. As illustrated in FIG. 9, the sipe 42 includes a linear portion 421 connected to the opening portion 40 and a linear portion 422 connected to the terminating end portion 40*t*. An angle θ2 between a straight line L11 obtained by extending the groove center line of the linear portion 421 and a straight line L21 obtained by extending the groove center line of the linear portion 422 (that is, an angle between the linear portions) is preferably 60 degrees or more and 160 degrees or less. The angle θ2, which is the bend angle of the sipe 42, within this range allows the wet braking performance and the wear resistance performance to be improved.

Here, the length of the groove center of the sipe 42 is defined as L420, and the length of the portion of the sipe 42 other than the chamfered portion 82 is defined as L421. The ratio L420/L421 of the length L421 to the length L420 is preferably 0.1 or more and 0.5 or less. The ratio L420/L421 within this range allows the wet braking performance and the wear resistance performance to be improved.

The width of the chamfered portion 82 at the position of the opening portion 40 of the sipe 42 is defined as W421, and the width of the terminating end portion of the chamfered portion 82 is defined as W422. The ratio W421/W422 of the width W421 to the width W422 is preferably 0.3 or more and 0.8 or less. The ratio W421/W422 within this range allows the drainage performance to be maintained and the wet braking performance to be improved.

At the opening portion 40 of the sipe 42, the angle θ40 of the linear portion 421 of the sipe 42 with respect to the tire circumferential direction is an acute angle and is preferably 30 degrees or more and 80 degrees or less. The angle θ40 within this range allows the wet braking performance and the wear resistance performance to be improved.

Center Land Portion

Figure 10:
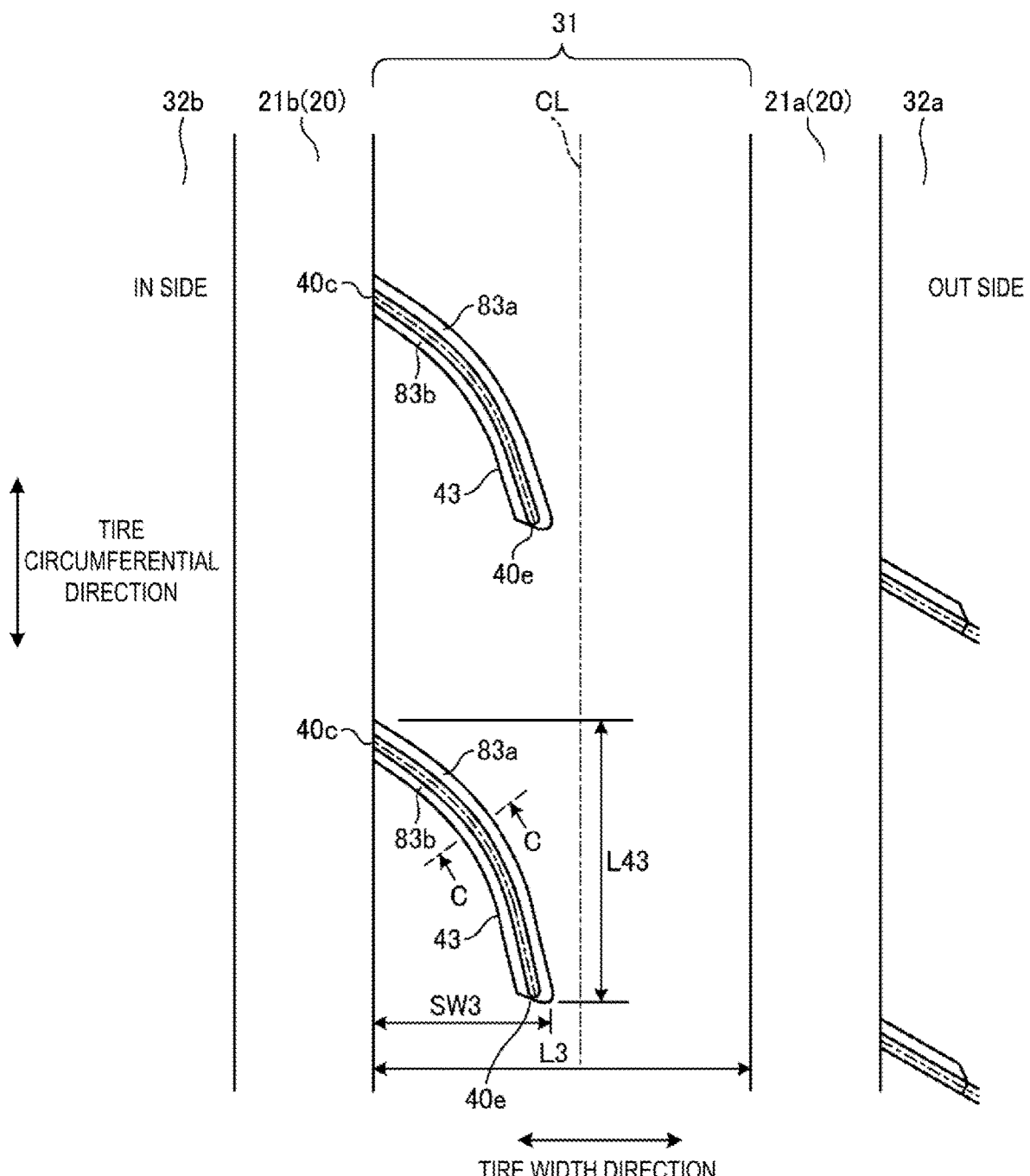
FIG. 10 is an enlarged view illustrating a center land portion in FIG. 2.

FIG. 10 is an enlarged view of the center land portion 31 in FIG. 2. As illustrated in FIG. 10, the center land portion 31 is provided with a sipe 43 (third sipe). A plurality of sipes 43 is provided side by side in the tire circumferential direction. The sipe 43 is bent in the center land portion 31. When the opening portion 40*c* of the center main groove 21*b* of the sipe 43 is used as a reference, the sipe 43 is inclined from the position of the opening portion 40*c* toward the lower right in FIG. 10. Therefore, the sipe 43 extends in the tire width direction and the tire circumferential direction. The sipe 43 does not extend through the center land portion 31. That is, one end of the sipe 43 opens to the center main groove 21*b*, and the other end of the sipe 43 terminates at a terminating end portion 40*e* within the center land portion 31. The sipe 43 does not extend through the center land portion 31. The dot-dash line in FIG. 10 is a groove center line of the sipe 43.

The ratio SW3/L3 of an extension length SW3 of the sipe 43 in the tire width direction to the length of the center land portion 31 in the tire width direction, that is, the land portion width L3 is preferably 0.3 or more and 0.5 or less. The ratio SW3/L3 within this range allows the wet braking performance and the wear resistance performance to be improved.

The ratio L43/SW3 of an extension length L43 of the sipe 43 in the tire circumferential direction to an extension length SW3 of the sipe 43 in the tire width direction is preferably 0.3 or more and 0.5 or less. The ratio L43/SW3 within this range allows the wet braking performance and the wear resistance performance to be improved.

The sipe 43 has a chamfered portion 83 (third chamfered portion). The chamfered portion 83 is provided on both sides of the sipe 43 in the groove width direction. In this example, the chamfered portion 83 is provided over the entire length of the sipe 43.

Cross-Sectional Shape of Third Chamfered Portion

Figure 11:
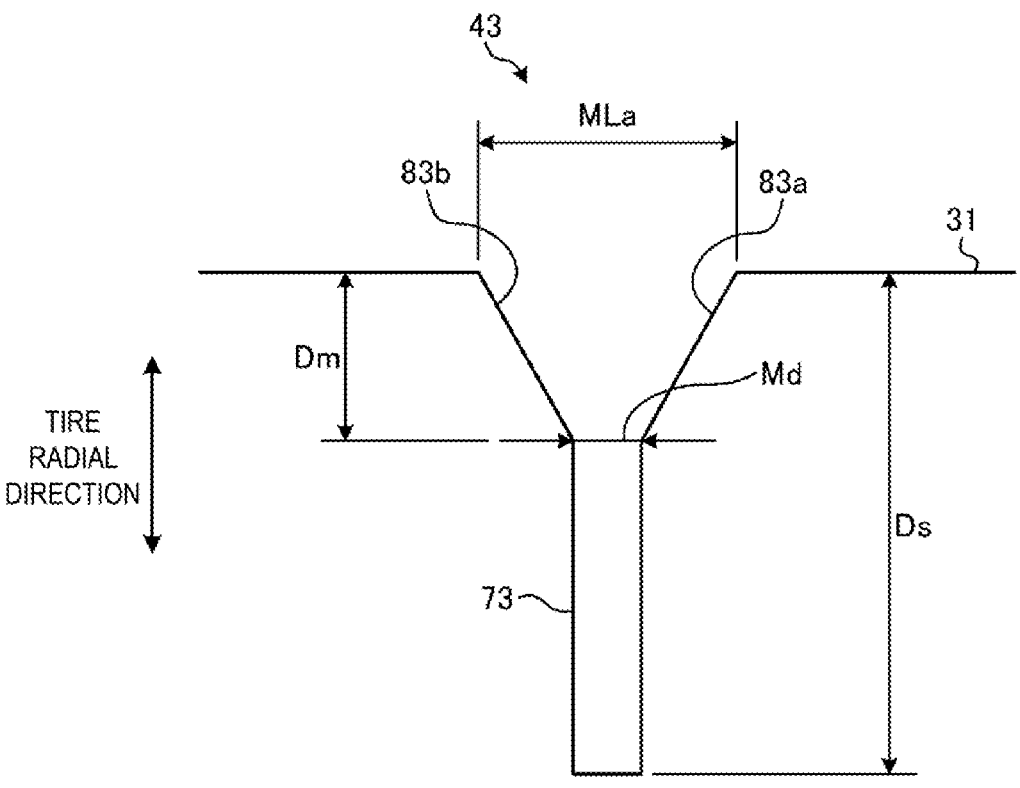
FIG. 11 is a view illustrating an example of a cross-sectional shape of a chamfered portion in FIG. 10.

FIG. 11 is a diagram illustrating an example of the cross-sectional shape of the chamfered portion 83 in FIG. 10. FIG. 11 is a cross-sectional view taken along a line C-C in FIG. 10. As illustrated in FIG. 11, the sipe 43 includes a body portion 73 extending from the tread surface of the center land portion 31 in the tire radial direction, that is, in the groove depth direction and chamfered portions 83*a* and 83*b* provided on both sides of the opening portion of the body portion 73 to the center land portion 31.

In FIG. 11, the depth of the body portion 73 including the depth of the chamfered portions 83*a* and 83*b* is Ds, the depth of the chamfered portions 83*a* and 83*b* (the depth of the maximum depth portion) is Dm, the groove depth of the circumferential main groove 20 is D, and the depths satisfy a relationship D>Ds>Dm. Such a relationship in depth allows block rigidity to be maintained to improve the wear resistance performance as well as the wet braking performance.

The depth Ds of the body portion 73 including the depth of the chamfered portions 83*a* and 83*b* is, for example, 3 mm or more and 6 mm or less. The depth (depth of the maximum depth portion) Dm of the chamfered portions 83*a* and 83*b* is, for example, 1 mm or more and 2 mm or less.

The width of the tread surface of the center land portion 31 in the direction orthogonal to the extension direction of the body portion 73, that is, the width MLa including the chamfered portions 83*a* and 83*b* is preferably 4.0 mm or more and 10.0 mm or less. The width MLa satisfies a relationship MLa>Dm with respect to the depth Dm of the chamfered portions 83a and 83b. The width MLa of the chamfered portion 81 becomes narrower toward the maximum depth portion Md. Such a relationship in depth allows block rigidity to be maintained to improve the wet braking performance and the wear resistance performance.

Figure 12:
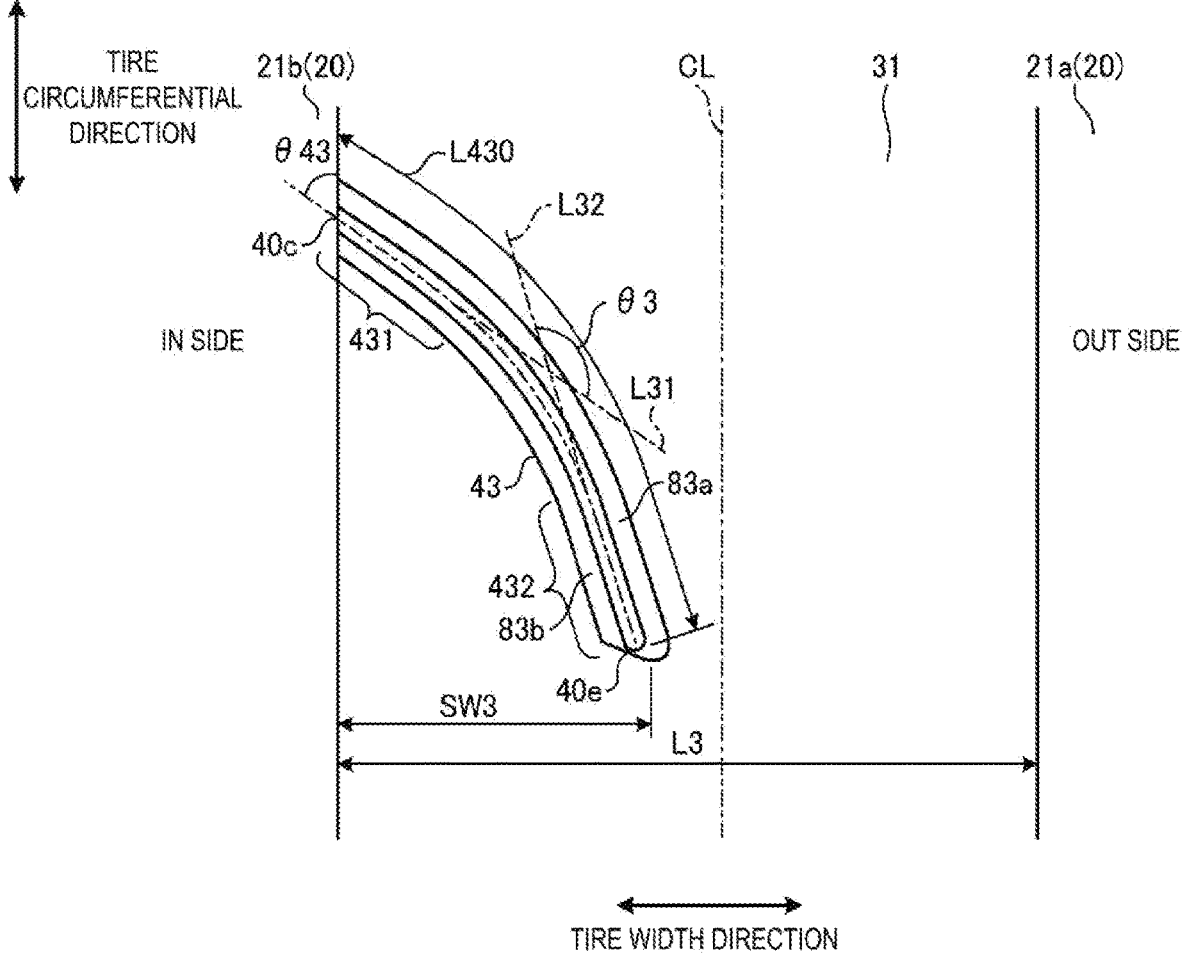
FIG. 12 is an enlarged view illustrating part of FIG. 10.

FIG. 12 is an enlarged view illustrating part of FIG. 10. As illustrated in FIG. 12, the sipe 43 includes a linear portion 431 connected to the opening portion 40c and a linear portion 432 connected to the terminating end portion 40e. The angle θ3 between a straight line L31 obtained by extending the groove center line of the linear portion 431 and a straight line L32 obtained by extending the groove center line of the linear portion 432 is preferably 60 degrees or more and 160 degrees or less. The angle θ3, which is the bend angle of the sipe 43, within this range allows the wet braking performance and the wear resistance performance to be improved.

At the opening portion 40c of the sipe 42, the angle θ43 of the linear portion 431 of the sipe 43 with respect to the tire circumferential direction is preferably 30 degrees or more and 80 degrees or less. The angle θ43 within this range allows the wet braking performance and the wear resistance performance to be improved.

Inner Shoulder Land Portion

Figure 13:
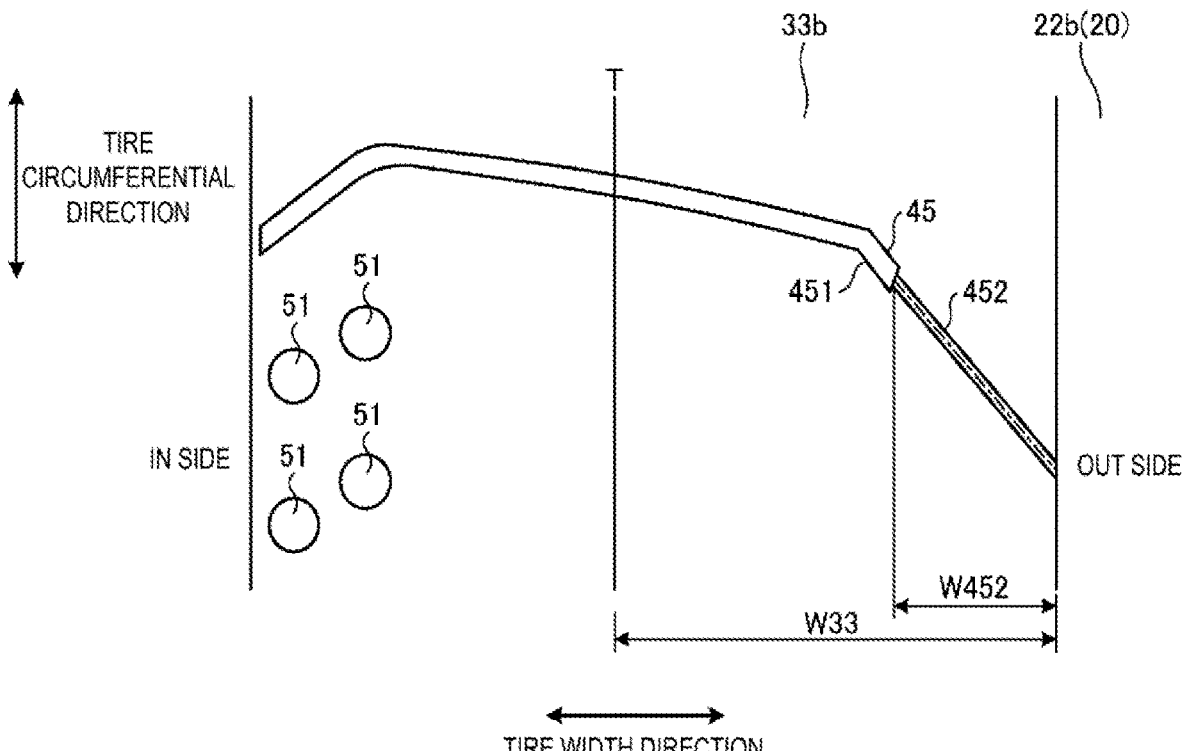
FIG. 13 is an enlarged view illustrating an inner shoulder land portion in FIG. 2.

FIG. 13 is an enlarged view of the inner shoulder land portion 33b in FIG. 2. As illustrated in FIG. 13, the inner shoulder land portion 33b has a shoulder lug groove 45. The shoulder lug grooves 45 extend in the tire circumferential direction and the tire width direction. The shoulder lug groove includes a lug groove 451 and a sipe 452. The lug groove 451 and the sipe 452 extend in different directions.

One end of the lug groove 451 is connected to the sipe 452. The other end of the lug groove 451 extends beyond the ground contact edge T. One end of the sipe 452 is connected to the lug groove 451. The other end of the sipe 452 is connected to the shoulder main groove 22b. That is, the lug groove 451 is connected to the shoulder main groove 22b via the sipe 452. The ratio W452/W33 of an extension length W452 of the sipe 452 in the tire width direction to a distance W33 in the tire width direction from the shoulder main groove 22b to the ground contact edge T is preferably 0.3 or more and 0.8 or less. The ratio W452/W33 within this range allows the wet braking performance and the wear resistance performance to be improved.

The inner shoulder land portion 33b has a plurality of dimples 51. The dimples 51 are recess portions recessed from the outer surface of the tire 100 toward the cavity side. The dimples 51 are provided in an end region on the outer side of the inner shoulder land portion 33b in the tire width direction. The dimples 51 are provided on the outer side of the ground contact edge T. Providing the dimples 51 can suppress an increase in the rigidity of the outer surface of the tire 100.

Outer Shoulder Land Portion

Figure 14:
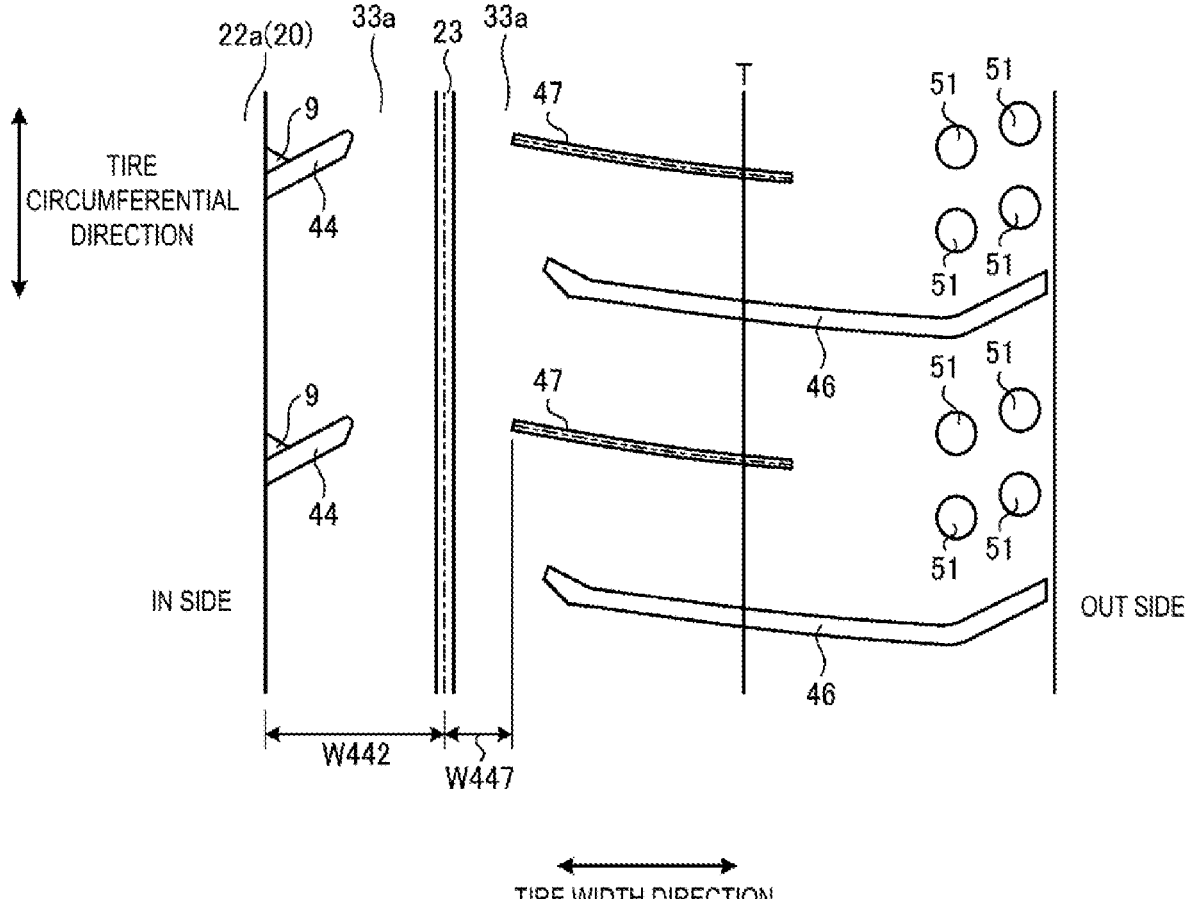
FIG. 14 is an enlarged view illustrating an outer shoulder land portion in FIG. 2.

FIG. 14 is an enlarged view of the outer shoulder land portion 33a in FIG. 2. As illustrated in FIG. 14, the outer shoulder land portion 33a has a shoulder lug groove 46, a shoulder sipe 47, a circumferential narrow groove 23, and a lug groove 44. The shoulder lug groove 46 extends in the tire width direction and the tire circumferential direction. The shoulder sipe 47 extends in the tire width direction and the tire circumferential direction. The shoulder lug groove 46 and the shoulder sipe 47 are alternately arranged in the tire circumferential direction. One end of the lug groove 44 terminates within the outer shoulder land portion 33a, and the other end extends beyond the grounding contact edge T to the outer side of the grounding contact edge T. The lug groove 44 is not connected to the shoulder main groove 22a. One end of the shoulder sipe 47 terminates within the outer shoulder land portion 33a, and the other end extends beyond the ground contact edge T to the outer side of the ground contact edge T. The shoulder sipe 47 is not connected to the shoulder main groove 22a.

The circumferential narrow groove 23 extends in the tire circumferential direction. The groove width of the circumferential narrow groove 23 is preferably 1.0 mm or more and 4.0 mm or less. The groove width of the circumferential narrow groove 23 within this range allows the wet braking performance and the wear resistance performance to be improved.

The distance from the groove center position of the circumferential narrow groove 23 to the shoulder lug groove 22a is defined as W442. The distance from the groove center position of the circumferential narrow groove 23 to the shoulder sipe 47 is defined as W447. The ratio W447/W442 of the distance W447 to the distance W442 is preferably 0.3 or more and 0.8 or less. The ratio W447/W442 within this range allows the wet braking performance and the wear resistance performance to be improved.

The outer shoulder land portion 33a has a plurality of dimples 51. The dimples 51 are recess portions recessed from the outer surface of the tire 100 toward the cavity side. The dimple 51 is provided in an end region on the outer side in the tire width direction of the outer shoulder land portion 33a. The dimples 51 are provided on the outer side of the ground contact edge T. Providing the dimples 51 can suppress an increase in the rigidity of the outer surface of the tire 100.

Land portion width, sipe extension length, sipe bend angle

Returning to FIG. 2, the land portion width L1 of the first intermediate land portion 32a, the land portion width L2 of the second intermediate land portion 32b, and the land portion width L3 of the center land portion 31 preferably satisfy a relationship L1<L2<L3. The extension length SW1 of the sipe 41 of the first intermediate land portion 32a in the tire width direction, the extension length SW2 of the sipe 42 of the second intermediate land portion 32b in the tire width direction, and the extension length SW3 of the sipe 43 of the center land portion 31 in the tire width direction preferably satisfy a relationship SW1>SW2>SW3. Furthermore, it is preferable that the ratios satisfy a relationship of the ratio SW1/L1>the ratio SW2/L2>the ratio SW3/L3. Such a size relationship allows the rigidity of each land portion to be made uniform and the wet braking performance and the wear resistance performance to be improved.

As described above, when the land portion widths L1, L2, and L3 satisfy a relationship L1<L2<L3, the angle θ1 that is the bend angle of the sipe 41 of the first intermediate land portion 32a having the narrowest land portion width L1, the angle θ2 that is the bend angle of the sipe 42 of the second intermediate land portion 32b having the land portion width L2, and the angle θ3 that is the bend angle of the sipe 43 of the center land portion 31 having the widest land portion width L3 are preferably obtuse angles. The angles θ1, θ2, and θ3 satisfy a relationship θ1<θ2<θ3. That is, the narrower the land portion width, the smaller the bend angle (that is, close to 90 degrees), and the wider the land portion width, the larger the bend angle (that is, close to 180 degrees). The three bend angles having such a relationship allows the rigidity of each land portion to be made uniform and the wet braking performance and the wear resistance performance to be improved.

Vehicle Mounting Direction

The mounting direction of the tire 100 of the present embodiment with respect to the vehicle is designated. That is, when mounted on a vehicle, an orientation of the tire 100 of the present embodiment with respect to the outer side and the inner side of the vehicle in the tire width direction is designated. Although not illustrated in the drawings, the orientations are designated by, for example, a mounting direction indicator provided on the sidewall portion 6. The mounting direction indicator is an indicator portion config- ured to indicate that the tire is mounted on the vehicle such that the vehicle inner side region when mounted on the vehicle is placed on the inner side in the vehicle width direction. Examples of the mounting direction indicator portion include a mark and a recess/protrusion on a sidewall portion of the tire. For example, Economic Commission for Europe Regulation, Article 30 (ECE R30) requires that a mounting direction indicator portion be provided on the sidewall portion on the outer side in the vehicle width direction with the tire mounted on a vehicle. The orientation with respect to the outer side and the inner side of the vehicle is designated by the mounting direction indicator, and the side facing the outer side of the vehicle when the tire is mounted on the vehicle is a vehicle outer side and the side facing the inner side of the vehicle when the tire is mounted on the vehicle is a vehicle inner side. Note that the desig- nations of the vehicle outer side and the vehicle inner side are not limited to cases when mounted on the vehicle. For example, when the tire is mounted on a rim, orientation of the rim with respect to the outer side and the inner side of the vehicle in the tire width direction is determined. Thus, when mounted on a rim, the orientation of the tire 100 with respect to the vehicle outer side and the vehicle inner side in the tire width direction is designated.

EXAMPLES

Tables 1 to 7 are tables illustrating the results of perfor- mance tests of tires according to the present embodiment. In the performance tests, wet braking performance and wear resistance performance were evaluated for a plurality of types of test tires. The test tires having a size of 195/65R15 were assembled on wheels is placed on a rim size of 15×6 J, and the tires were inflated to an air pressure of 240 kPa and mounted on a test vehicle of an FF minivan (total engine displacement of 2000 cc).

For wet braking performance, the braking distance was measured on a test vehicle at a speed of 100 km/h on a wet road surface having a water depth of 1 mm. Using the reciprocal of the measurement value, a larger index value indicates superior wet performance. Wear resistance perfor- mance was evaluated by measuring the distance traveled on the test vehicle on a dry road surface until the tread surface was fully worn, that is, the distance traveled until a wear indicator provided in the circumferential main groove 20 was exposed and indexing the measured running distance. A larger index value indicates superior wear resistance perfor- mance.

The tire of Conventional Example 1 in Table 1 is a tire in which a sipe having a bent portion is provided in the land portion, and the sipe terminates within the land portion. The tire of Comparative Example 1 in Table 1 is a tire in which a sipe having a bent portion is provided in the land portion, and the sipe extends through the land portion. The tire of Comparative Example 2 in Table 3 is a tire in which the sipe provided in the land portion has a bent portion, but the extension line of the second inclined portion and the exten- sion line of the groove center line of the first lug groove are not substantially parallel.

The tires of Examples 1 to 52 illustrated in Tables 1 to 7 are tires in which the first sipe 41 provided in the first intermediate land portion 32a is bent, and the first sipe 41 includes a first inclined portion open to the second main groove 21a and a second inclined portion open to the first main groove 22a, and an extension line of the second inclined portion is substantially parallel with an extension line of the groove center line of the first lug groove. As illustrated in Tables 1 to 7, the tires of Examples 1 to 52 exhibited good wet braking performance and wear resistance performance.

TABLE 1

| | | | Conventional Example 1 | Example 1 | Example 2 | Example 3 |
|---|---|---|---|---|---|---|
| First intermediate land portion | Shape of sipe | Presence of bend | No | Yes | Yes | Yes |
| | Arrangement of inclined portion and lug groove on vehicle outer side | Substantially parallel | — | Yes | Yes | Yes |
| | Sipe width ratio | SW1/L1 | 0.5 | 1.0 | 1.0 | 1.0 |
| | Chamfered portion width ratio | MW1/SW1 | 0.0 | 0.3 | 0.2 | 0.4 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | $\theta a$ (degree) | 60 | 60 | 60 | 60 |
| | Inclination angle | $\theta b$ (degree) | 60 | 60 | 60 | 60 |
| | Angle between first inclined portion and second inclined portion | $\theta 1$ (degree) | 120 | 120 | 120 | 120 |
| | Extension length in tire circumferential direction with respect to extension length of lug groove in tire width direction | L44/W44 | 0.6 | 0.6 | 0.6 | 0.6 |

TABLE 1-continued

| | | | | | | |
|---|---|---|---|---|---|---|
| Second intermediate land portion | Shape of sipe | Presence of bend | No | Yes | Yes | Yes |
| | Sipe width ratio | SW2/L2 | 0.6 | 0.6 | 0.6 | 0.6 |
| | Chamfered portion width ratio | MW2/SW2 | 0.0 | 0.0 | 0.0 | 0.0 |
| | Extension length in tire circumferential direction with respect to extension length in tire width direction | L42/SW2 | 0.6 | 0.6 | 0.6 | 0.6 |
| | Angle between linear portions | θ2 (degree) | 120 | 120 | 120 | 120 |
| | Length of portion other than chamfered portion with respect to length of groove center of sipe | L420/L421 | 0.3 | 0.3 | 0.3 | 0.3 |
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | θ40 (degree) | 60 | 60 | 60 | 60 |
| Center land portion | Shape of sipe | Presence of bend | No | Yes | Yes | Yes |
| | Sipe width ratio | SW3/L3 | 1 | 1.0 | 0.4 | 0.4 |
| | Extension length in tire circumferential direction with respect to extension length in tire width direction | L43/SW3 | 0.4 | 0.4 | 0.4 | 0.4 |
| | Angle between linear portions | θ3 (degree) | 120 | 120 | 120 | 120 |
| | Angle of linear portion of sipe in opening portion | θ43 (degree) | 60 | 60 | 60 | 60 |
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | No | No | No | No |
| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
| | Relationship between lug groove and sipe | Lug groove and sipe are alternately arranged | No | No | No | No |
| | Wear resistance performance | | 100 | 101 | 101 | 100 |
| | Wet braking performance | | 100 | 103 | 103 | 104 |

| | | | Comparative Example 1 | Example 4 | Example 5 | Example 6 |
|---|---|---|---|---|---|---|
| First intermediate land portion | Shape of sipe | Presence of bend | No | Yes | Yes | Yes |
| | Arrangement of inclined portion and lug groove on vehicle outer side | Substantially parallel | — | Yes | Yes | Yes |
| | Sipe width ratio | SW1/L1 | 1.0 | 1.0 | 1.0 | 1.0 |
| | Chamfered portion width ratio | MW1/SW1 | 0.0 | 0.3 | 0.3 | 0.3 |
| | Extension length in tire circumferential direction with respect to extension length in tire width direction | L41/SW1 | 0.3 | 0.2 | 0.4 | 0.3 |
| | Extension length of chamfered portion with respect to length to bend point | MW1/WP1 | 0.7 | 0.7 | 0.7 | 0.5 |
| | Extension length in tire circumferential direction with respect to extension length of chamfered portion in tire width direction | LM1/MW1 | 0.6 | 0.6 | 0.6 | 0.6 |
| | Inclination angle | θa (degree) | 60 | 60 | 60 | 60 |
| | Inclination angle | θb (degree) | 60 | 60 | 60 | 60 |
| | Angle between first inclined portion and second inclined portion | θ1 (degree) | 120 | 120 | 120 | 120 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.0 | 0.0 | 0.0 | 0.0 |
| | Extension length in tire circumferential direction with respect to extension length in tire width direction | L42/SW2 | 0.6 | 0.6 | 0.6 | 0.6 |
| | Angle between linear portions | θ2 (degree) | 120 | 120 | 120 | 120 |
| | Length of portion other than chamfered portion with respect to length of groove center of sipe | L420/L421 | 0.3 | 0.3 | 0.3 | 0.3 |

TABLE 1-continued

| | | | | | | |
|---|---|---|---|---|---|---|
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | θ40 (degree) | 60 | 60 | 60 | 60 |
| Center land portion | Shape of sipe | Presence of bend | Yes | Yes | Yes | Yes |
| | Sipe width ratio | SW3/L3 | 1.0 | 0.4 | 0.4 | 0.4 |
| | Extension length in tire circumferential direction with respect to extension length in tire width direction | L43/SW3 | 0.4 | 0.4 | 0.4 | 0.4 |
| | Angle between linear portions | θ3 (degree) | 120 | 120 | 120 | 120 |
| | Angle of linear portion of sipe in opening portion | θ43 (degree) | 60 | 60 | 60 | 60 |
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | No | No | No | No |
| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
| | Relationship between lug groove and sipe | Lug groove and sipe are alternately arranged | No | No | No | No |
| | Wear resistance performance | | 102 | 102 | 103 | 102 |
| | Wet braking performance | | 101 | 101 | 100 | 101 |

TABLE 2

| | | | Example 7 | Example 8 | Example 9 | Example 10 |
|---|---|---|---|---|---|---|
| First intermediate land portion | Shape of sipe | Presence of bend | Yes | Yes | Yes | Yes |
| | Arrangement of inclined portion and lug groove on vehicle outer side | Substantially parallel | Yes | Yes | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.9 | 0.7 | 0.7 | 0.7 |
| | Extension length in tire circumferential direction with respect to extension length of chamfered portion in tire width direction | LM1/MW1 | 0.6 | 0.3 | 0.8 | 0.6 |
| | Inclination angle | θa (degree) | 60 | 60 | 60 | 30 |
| | Inclination angle | θb (degree) | 60 | 60 | 60 | 60 |
| | Angle between first inclined portion and second inclined portion | θ1 (degree) | 120 | 120 | 120 | 120 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.0 | 0.0 | 0.0 | 0.0 |
| | Extension length in tire circumferential direction with respect to extension length in tire width direction | L42/SW2 | 0.6 | 0.6 | 0.6 | 0.6 |
| | Angle between linear portions | θ2 (degree) | 120 | 120 | 120 | 120 |
| | Length of portion other than chamfered portion with respect to length of groove center of sipe | L420/L421 | 0.3 | 0.3 | 0.3 | 0.3 |

TABLE 2-continued

| | | | | | | |
|---|---|---|---|---|---|---|
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | θ40 (degree) | 60 | 60 | 60 | 60 |
| Center land portion | Shape of sipe | Presence of bend | Yes | Yes | Yes | Yes |
| | Sipe width ratio | SW3/L3 | 0.4 | 0.4 | 0.4 | 0.4 |
| | Extension length in tire circumferential direction with respect to extension length in tire width direction | L43/SW3 | 0.4 | 0.4 | 0.4 | 0.4 |
| | Angle between linear portions | θ3 (degree) | 120 | 120 | 120 | 120 |
| | Angle of linear portion of sipe in opening portion | θ43 (degree) | 60 | 60 | 60 | 60 |
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | No | No | No | No |
| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
| | Relationship between lug groove and sipe | Lug groove and sipe are alternately arranged | No | No | No | No |
| | Wear resistance performance | | 102 | 102 | 102 | 102 |
| | Wet braking performance | | 101 | 101 | 101 | 101 |

| | | | Example 11 | Example 12 | Example 13 | Example 14 |
|---|---|---|---|---|---|---|
| First intermediate land portion | Shape of sipe | Presence of bend | Yes | Yes | Yes | Yes |
| | Arrangement of inclined portion and lug groove on vehicle outer side | Substantially parallel | Yes | Yes | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | θa (degree) | 80 | 60 | 60 | 60 |
| | Inclination angle | θb (degree) | 60 | 30 | 80 | 60 |
| | Angle between first inclined portion and second inclined portion | θ1 (degree) | 120 | 120 | 120 | 60 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.0 | 0.0 | 0.0 | 0.0 |
| | Extension length in tire circumferential direction with respect to extension length in tire width direction | L42/SW2 | 0.6 | 0.6 | 0.6 | 0.6 |
| | Angle between linear portions | θ2 (degree) | 120 | 120 | 120 | 120 |
| | Length of portion other than chamfered portion with respect to length of groove center of sipe | L420/L421 | 0.3 | 0.3 | 0.3 | 0.3 |
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | θ40 (degree) | 60 | 60 | 60 | 60 |

TABLE 2-continued

| Center land portion | Shape of sipe | Presence of bend | Yes | Yes | Yes | Yes |
|---|---|---|---|---|---|---|
| | Sipe width ratio | SW3/L3 | 0.4 | 0.4 | 0.4 | 0.4 |
| | Extension length in tire circumferential direction with respect to extension length in tire width direction | L43/SW3 | 0.4 | 0.4 | 0.4 | 0.4 |
| | Angle between linear portions | θ3 (degree) | 120 | 120 | 120 | 12 |
| | Angle of linear portion of sipe in opening portion | θ43 (degree) | 60 | 60 | 60 | 60 |
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | No | No | No | No |
| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
| | Relationship between lug groove and sipe | Lug groove and sipe are alternately arranged | No | No | No | No |
| | Wear resistance performance | | 102 | 102 | 102 | 102 |
| | Wet braking performance | | 101 | 101 | 101 | 101 |

TABLE 3

| | | | Example 15 | Example 16 | Example 17 | Example 18 |
|---|---|---|---|---|---|---|
| First intermediate land portion | Shape of sipe | Presence of bend | Yes | Yes | Yes | Yes |
| | Arrangement of inclined portion and lug groove on vehicle outer side | Substantially parallel | Yes | Yes | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | θa (degree) | 60 | 60 | 60 | 60 |
| | Inclination angle | θb (degree) | 60 | 60 | 60 | 60 |
| | Angle between first inclined portion and second inclined portion | θ1 (degree) | 160 | 120 | 120 | 120 |
| | Extension length in tire circumferential direction with respect to extension length of lug groove in tire width direction | L44/W44 | 0.6 | 0.4 | 0.8 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.0 | 0.0 | 0.0 | 0.5 |
| | Extension length in tire circumferential direction with respect to extension length in tire width direction | L42/SW2 | 0.6 | 0.6 | 0.6 | 0.6 |
| | Angle between linear portions | θ2 (degree) | 120 | 120 | 120 | 120 |
| | Length of portion other than chamfered portion with respect to length of groove center of sipe | L420/L421 | 0.3 | 0.3 | 0.3 | 0.3 |
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | θ40 (degree) | 60 | 60 | 60 | 60 |

TABLE 3-continued

| Center land portion | Shape of sipe | Presence of bend | Yes | Yes | Yes | Yes |
|---|---|---|---|---|---|---|
| | Sipe width ratio | SW3/L3 | 0.4 | 0.4 | 0.4 | 1.0 |
| | Extension length in tire circumferential direction with respect to extension length in tire width direction | L43/SW3 | 0.4 | 0.4 | 0.4 | 0.4 |
| | Angle between linear portions | θ3 (degree) | 120 | 120 | 120 | 120 |
| | Angle of linear portion of sipe in opening portion | θ43 (degree) | 60 | 60 | 60 | 60 |
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | No | No | No | No |
| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
| | Relationship between lug groove and sipe | Lug groove and sipe are alternately arranged | No | No | No | No |
| | Wear resistance performance | | 102 | 102 | 102 | 100 |
| | Wet braking performance | | 101 | 101 | 102 | 104 |

| | | | Example 19 | Comparative Example 2 | Example 20 | Example 21 |
|---|---|---|---|---|---|---|
| First intermediate land portion | Shape of sipe | Presence of bend | Yes | Yes | Yes | Yes |
| | Arrangement of inclined portion and lug groove on vehicle outer side | Substantially parallel | Yes | No | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | θa (degree) | 60 | 60 | 60 | 60 |
| | Inclination angle | θb (degree) | 60 | 60 | 60 | 60 |
| | Angle between first inclined portion and second inclined portion | θ1 (degree) | 120 | 120 | 120 | 120 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.5 | 0.6 | 0.7 |
| | Chamfered portion width ratio | MW2/SW2 | 0.5 | 0.3 | 0.4 | 0.6 |
| | Extension length in tire circumferential direction with respect to extension length in tire width direction | L42/SW2 | 0.6 | 0.6 | 0.6 | 0.6 |
| | Angle between linear portions | θ2 (degree) | 120 | 120 | 120 | 120 |
| | Length of portion other than chamfered portion with respect to length of groove center of sipe | L420/L421 | 0.3 | 0.3 | 0.3 | 0.3 |
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | θ40 (degree) | 60 | 60 | 60 | 60 |
| Center land portion | Shape of sipe | Presence of bend | Yes | Yes | Yes | Yes |
| | Sipe width ratio | SW3/L3 | 0.4 | 0.7 | 0.4 | 0.4 |
| | Extension length in tire circumferential direction with respect to extension length in tire width direction | L43/SW3 | 0.4 | 0.4 | 0.4 | 0.4 |
| | Angle between linear portions | θ3 (degree) | 120 | 120 | 120 | 120 |
| | Angle of linear portion of sipe in opening portion | θ43 (degree) | 60 | 60 | 60 | 60 |

TABLE 3-continued

| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | No | No | No | No |
| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
| | Relationship between lug groove and sipe | Lug groove and sipe are alternately arranged | No | No | No | No |
| | Wear resistance performance | | 103 | 101 | 103 | 103 |
| | Wet braking performance | | 103 | 104 | 103 | 103 |

TABLE 4

| | | | Example 22 | Example 23 | Example 24 | Example 25 |
|---|---|---|---|---|---|---|
| First intermediate land portion | Shape of sipe | Presence of bend | Yes | Yes | Yes | Yes |
| | Arrangement of inclined portion and lug groove on vehicle outer side | Substantially parallel | Yes | Yes | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | θa (degree) | 60 | 60 | 60 | 60 |
| | Inclination angle | θb (degree) | 60 | 60 | 60 | 60 |
| | Angle between first inclined portion and second inclined portion | θ1 (degree) | 120 | 120 | 120 | 120 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.5 | 0.5 | 0.5 | 0.5 |
| | Extension length in tire circumferential direction with respect to extension length in tire width direction | L42/SW2 | 0.6 | 0.6 | 0.6 | 0.6 |
| | Angle between linear portions | θ2 (degree) | 120 | 120 | 12 | 120 |
| | Length of portion other than chamfered portion with respect to length of groove center of sipe | L420/L421 | 0.3 | 0.3 | 0.3 | 0.3 |
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | θ40 (degree) | 60 | 60 | 60 | 60 |
| Center land portion | Shape of sipe | Presence of bend | Yes | Yes | Yes | Yes |
| | Sipe width ratio | SW3/L3 | 0.4 | 0.4 | 0.4 | 0.4 |
| | Extension length in tire circumferential direction with respect to extension length in tire width direction | L43/SW3 | 0.4 | 0.4 | 0.4 | 0.4 |
| | Angle between linear portions | θ3 (degree) | 120 | 120 | 120 | 120 |
| | Angle of linear portion of sipe in opening portion | θ43 (degree) | 60 | 60 | 60 | 60 |

TABLE 4-continued

| | | | | | | |
|---|---|---|---|---|---|---|
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | Yes | Yes | Yes | Yes |
| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
| | Relationship between lug groove and sipe | Lug groove and sipe are alternately arranged | No | Yes | Yes | Yes |
| | Wear resistance performance | | 102 | 102 | 102 | 102 |
| | Wet braking performance | | 104 | 104 | 104 | 104 |

| | | | Example 26 | Example 27 | Example 28 | Example 29 |
|---|---|---|---|---|---|---|
| First intermediate land portion | Shape of sipe | Presence of bend | Yes | Yes | Yes | Yes |
| | Arrangement of inclined portion and lug groove on vehicle outer side | Substantially parallel | Yes | Yes | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | $\theta a$ (degree) | 60 | 60 | 60 | 60 |
| | Inclination angle | $\theta b$ (degree) | 60 | 60 | 60 | 60 |
| | Angle between first inclined portion and second inclined portion | $\theta 1$ (degree) | 120 | 120 | 120 | 120 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.5 | 0.5 | 0.5 | 0.5 |
| | Extension length in tire circumferential direction with respect to extension length in tire width direction | L42/SW2 | 0.6 | 0.6 | 0.5 | 0.7 |
| | Angle between linear portions | $\theta 2$ (degree) | 120 | 120 | 120 | 120 |
| | Length of portion other than chamfered portion with respect to length of groove center of sipe | L420/L421 | 0.3 | 0.3 | 0.3 | 0.3 |
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | $\theta 40$ (degree) | 60 | 60 | 60 | 60 |
| Center land portion | Shape of sipe | Presence of bend | Yes | Yes | Yes | Yes |
| | Sipe width ratio | SW3/L3 | 0.4 | 0.4 | 0.4 | 0.4 |
| | Extension length in tire circumferential direction with respect to extension length in tire width direction | L43/SW3 | 0.4 | 0.4 | 0.4 | 0.4 |
| | Angle between linear portions | $\theta 3$ (degree) | 120 | 120 | 120 | 120 |
| | Angle of linear portion of sipe in opening portion | $\theta 43$ (degree) | 60 | 60 | 60 | 60 |
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | Yes | Yes | Yes | Yes |

TABLE 4-continued

| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
|---|---|---|---|---|---|---|
| | Relationship between lug groove and sipe | Lug groove and sipe are alternately arranged | Yes | Yes | Yes | Yes |
| | Wear resistance performance | | 102 | 102 | 102 | 102 |
| | Wet braking performance | | 104 | 104 | 105 | 103 |

TABLE 5

| | | | Example 30 | Example 31 | Example 32 | Example 33 |
|---|---|---|---|---|---|---|
| First intermediate land portion | Shape of sipe | Presence of bend | Yes | Yes | Yes | Yes |
| | Arrangement of inclined portion and lug groove on vehicle outer side | Substantially parallel | Yes | Yes | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | $\theta$a (degree) | 60 | 60 | 60 | 60 |
| | Inclination angle | $\theta$b (degree) | 60 | 60 | 60 | 60 |
| | Angle between first inclined portion and second inclined portion | $\theta$1 (degree) | 120 | 120 | 120 | 120 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.5 | 0.5 | 0.5 | 0.5 |
| | Extension length in tire circumferential direction with respect to extension length in tire width direction | L42/SW2 | 0.6 | 0.6 | 0.6 | 0.6 |
| | Angle between linear portions | $\theta$2 (degree) | 60 | 160 | 120 | 120 |
| | Length of portion other than chamfered portion with respect to length of groove center of sipe | L420/L421 | 0.3 | 0.3 | 0.1 | 0.5 |
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | $\theta$40 (degree) | 60 | 60 | 60 | 60 |
| Center land portion | Shape of sipe | Presence of bend | Yes | Yes | Yes | Yes |
| | Sipe width ratio | SW3/L3 | 0.4 | 0.4 | 0.4 | 0.4 |
| | Extension length in tire circumferential direction with respect to extension length in tire width direction | L43/SW3 | 0.4 | 0.4 | 0.4 | 0.4 |
| | Angle between linear portions | $\theta$3 (degree) | 120 | 120 | 120 | 120 |
| | Angle of linear portion of sipe in opening portion | $\theta$43 (degree) | 60 | 60 | 60 | 60 |
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | Yes | Yes | Yes | Yes |

TABLE 5-continued

| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
| | Relationship between lug groove and sipe | Lug groove and sipe are alternately arranged | Yes | Yes | Yes | Yes |
| | Wear resistance performance | | 102 | 102 | 102 | 102 |
| | Wet braking performance | | 104 | 104 | 104 | 104 |

| | | | Example 34 | Example 35 | Example 36 | Example 37 |
| --- | --- | --- | --- | --- | --- | --- |
| First intermediate land portion | Shape of sipe | Presence of bend | Yes | Yes | Yes | Yes |
| | Arrangement of inclined portion and lug groove on vehicle outer side | Substantially parallel | Yes | Yes | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | $\theta a$ (degree) | 60 | 60 | 60 | 60 |
| | Inclination angle | $\theta b$ (degree) | 60 | 60 | 60 | 60 |
| | Angle between first inclined portion and second inclined portion | $\theta 1$ (degree) | 120 | 120 | 120 | 120 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.5 | 0.5 | 0.5 | 0.5 |
| | Extension length in tire circumferential direction with respect to extension length in tire width direction | L42/SW2 | 0.6 | 0.6 | 0.6 | 0.6 |
| | Angle between linear portions | $\theta 2$ (degree) | 120 | 120 | 120 | 120 |
| | Length of portion other than chamfered portion with respect to length of groove center of sipe | L420/L421 | 0.3 | 0.3 | 0.3 | 0.3 |
| | Width of terminating end portion of chamfered portion with respect to width of chamfered portion at position of opening portion | W421/W422 | 0.3 | 0.8 | 0.6 | 0.6 |
| | Angle of linear portion of sipe in opening portion | $\theta 40$ (degree) | 60 | 60 | 30 | 80 |
| Center land portion | Shape of sipe | Presence of bend | Yes | Yes | Yes | Yes |
| | Sipe width ratio | SW3/L3 | 0.4 | 0.4 | 0.4 | 0.4 |
| | Extension length in tire circumferential direction with respect to extension length in tire width direction | L43/SW3 | 0.4 | 0.4 | 0.4 | 0.4 |
| | Angle between linear portions | $\theta 3$ (degree) | 120 | 120 | 120 | 120 |
| | Angle of linear portion of sipe in opening portion | $\theta 43$ (degree) | 60 | 60 | 60 | 60 |
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | Yes | Yes | Yes | Yes |

TABLE 5-continued

| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
|---|---|---|---|---|---|---|
| | Relationship between lug groove and sipe | Lug groove and sipe are alternately arranged | Yes | Yes | Yes | Yes |
| | Wear resistance performance | | 102 | 102 | 102 | 102 |
| | Wet braking performance | | 104 | 104 | 104 | 104 |

TABLE 6

| | | | Example 38 | Example 39 | Example 40 | Example 41 |
|---|---|---|---|---|---|---|
| First intermediate land portion | Shape of sipe | Presence of bend | Yes | Yes | Yes | Yes |
| | Arrangement of inclined portion and lug groove on vehicle outer side | Substantially parallel | Yes | Yes | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | θa (degree) | 60 | 60 | 60 | 60 |
| | Inclination angle | θb (degree) | 60 | 60 | 60 | 60 |
| | Angle between first inclined portion and second inclined portion | θ1 (degree) | 120 | 120 | 120 | 120 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.5 | 0.5 | 0.5 | 0.5 |
| | Extension length in tire circumferential direction with respect to extension length in tire width direction | L42/SW2 | 0.6 | 0.6 | 0.6 | 0.6 |
| | Angle between linear portions | θ2 (degree) | 120 | 120 | 120 | 120 |
| | Length of portion other than chamfered portion with respect to length of groove center of sipe | L420/L421 | 0.3 | 0.3 | 0.3 | 0.3 |
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | θ40 (degree) | 60 | 60 | 60 | 60 |
| Center land portion | Shape of sipe | Presence of bend | Yes | Yes | Yes | Yes |
| | Sipe width ratio | SW3/L3 | 0.3 | 0.5 | 0.4 | 0.4 |
| | Extension length in tire circumferential direction with respect to extension length in tire width direction | L43/SW3 | 0.4 | 0.4 | 0.4 | 0.4 |
| | Angle between linear portions | θ3 (degree) | 120 | 120 | 120 | 120 |
| | Angle of linear portion of sipe in opening portion | θ43 (degree) | 60 | 60 | 60 | 60 |

TABLE 6-continued

| | | | | | | |
|---|---|---|---|---|---|---|
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | Yes | Yes | Yes | Yes |
| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
| | Relationship between lug groove and sipe | Lug groove and sipe are alternately arranged | Yes | Yes | Yes | Yes |
| | Wear resistance performance | | 103 | 101 | 102 | 102 |
| | Wet braking performance | | 103 | 105 | 104 | 104 |

| | | | Example 42 | Example 43 | Example 44 | Example 45 |
|---|---|---|---|---|---|---|
| First intermediate land portion | Shape of sipe | Presence of bend | Yes | Yes | Yes | Yes |
| | Arrangement of inclined portion and lug groove on vehicle outer side | Substantially parallel | Yes | Yes | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | $\theta a$ (degree) | 60 | 60 | 60 | 60 |
| | Inclination angle | $\theta b$ (degree) | 60 | 60 | 60 | 60 |
| | Angle between first inclined portion and second inclined portion | $\theta 1$ (degree) | 120 | 120 | 120 | 120 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.5 | 0.5 | 0.5 | 0.5 |
| | Extension length in tire circumferential direction with respect to extension length in tire width direction | L42/SW2 | 0.6 | 0.6 | 0.6 | 0.6 |
| | Angle between linear portions | $\theta 2$ (degree) | 120 | 120 | 120 | 120 |
| | Length of portion other than chamfered portion with respect to length of groove center of sipe | L420/L421 | 0.3 | 0.3 | 0.3 | 0.3 |
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | $\theta 40$ (degree) | 60 | 60 | 60 | 60 |
| Center land portion | Shape of sipe | Presence of bend | Yes | Yes | Yes | Yes |
| | Sipe width ratio | SW3/L3 | 0.4 | 0.4 | 0.4 | 0.4 |
| | Extension length in tire circumferential direction with respect to extension length in tire width direction | L43/SW3 | 0.4 | 0.3 | 0.5 | 0.4 |
| | Angle between linear portions | $\theta 3$ (degree) | 120 | 120 | 120 | 60 |
| | Angle of linear portion of sipe in opening portion | $\theta 43$ (degree) | 60 | 60 | 60 | 60 |

TABLE 6-continued

| | | | | | | |
|---|---|---|---|---|---|---|
| Inner shoulder land portion | Extension length of sipe with respect to distance from shoulder main groove to ground contact edge | W452/W33 | 0.6 | 0.6 | 0.6 | 0.6 |
| | Relationship between lug groove and sipe | Lug groove and sipe are connected | Yes | Yes | Yes | Yes |
| Outer shoulder land portion | Distance from circumferential narrow groove to shoulder sipe with respect to distance from circumferentialnarrow groove to shoulder lug groove | W447/W442 | 0.6 | 0.6 | 0.6 | 0.6 |
| | Relationship between lug groove and sipe | Lug groove and sipe are alternately arranged | Yes | Yes | Yes | Yes |
| | Wear resistance performance | | 102 | 103 | 101 | 102 |
| | Wet braking performance | | 104 | 103 | 105 | 104 |

TABLE 7

| | | | Example 46 | Example 47 | Example 48 | Example 49 |
|---|---|---|---|---|---|---|
| First intermediate land portion | Shape of sipe | Presence of bend | Yes | Yes | Yes | Yes |
| | Arrangement of inclined portion and lug groove on vehicle outer side | Substantially parallel | Yes | Yes | Yes | Yes |
| | Sipe width ratio | SW1/L1 | 1.0 | 1.0 | 1.0 | 1.0 |
| | Chamfered portion width ratio | MW1/SW1 | 0.3 | 0.3 | 0.3 | 0.3 |
| | Extension length in tire circumferential direction with respect to extension length in tire width direction | L41/SW1 | 0.3 | 0.3 | 0.3 | 0.3 |
| | Extension length of chamfered portion with respect to length to bend point | MW1/WP1 | 0.7 | 0.7 | 0.7 | 0.7 |
| | Extension length in tire circumferential direction with respect to extension length of chamfered portion in tire width direction | LM1/MW1 | 0.6 | 0.6 | 0.6 | 0.6 |
| | Inclination angle | θa (degree) | 60 | 60 | 60 | 60 |
| | Inclination angle | θb (degree) | 60 | 60 | 60 | 60 |
| | Angle between first inclined portion and second inclined portion | θ1 (degree) | 120 | 120 | 120 | 120 |
| | Extension length in tire circumferential direction with respect to extension length of lug groove in tire width direction | L44/W44 | 0.6 | 0.6 | 0.6 | 0.6 |
| Second intermediate land portion | Shape of sipe | Presence of bend | Yes | Yes | Yes | Yes |
| | Sipe width ratio | SW2/L2 | 0.6 | 0.6 | 0.6 | 0.6 |
| | Chamfered portion width ratio | MW2/SW2 | 0.5 | 0.5 | 0.5 | 0.5 |
| | Extension length in tire circumferential direction with respect to extension length in tire width direction | L42/SW2 | 0.6 | 0.6 | 0.6 | 0.6 |
| | Angle between linear portions | θ2 (degree) | 120 | 120 | 120 | 120 |
| | Length of portion other than chamfered portion with respect to length of groove center of sipe | L420/L421 | 0.3 | 0.3 | 0.3 | 0.3 |
| | Width of terminating end portion of chamfered portion with respect to width of chamfered portion at position of opening portion | W421/W422 | 0.6 | 0.6 | 0.6 | 0.6 |
| | Angle of linear portion of sipe in opening portion | θ40 (degree) | 60 | 60 | 60 | 60 |
| Center land portion | Shape of sipe | Presence of bend | Yes | Yes | Yes | Yes |
| | Sipe width ratio | SW3/L3 | 0.4 | 0.4 | 0.4 | 0.4 |
| | Extension length in tire circumferential direction with respect to extension length in tire width direction | L43/SW3 | 0.4 | 0.4 | 0.4 | 0.4 |

TABLE 7-continued

|  |  |  |  |  |  |  |
|---|---|---|---|---|---|---|
|  | Angle between linear portions | θ3 (degree) | 160 | 120 | 120 | 120 |
|  | Angle of linear portion of sipe in opening portion | θ43 (degree) | 60 | 30 | 80 | 60 |
| Inner shoulder land portion | Extension length of sipe with respect to distance from shoulder main groove to ground contact edge | W452/W33 | 0.6 | 0.6 | 0.6 | 0.3 |
|  | Relationship between lug groove and sipe | Lug groove and sipe are connected | Yes | Yes | Yes | Yes |
| Outer shoulder land portion | Distance from circumferential narrow groove to shoulder sipe with respect to distance from circumferential narrow groove to shoulder lug groove | W447/W442 | 0.6 | 0.6 | 0.6 | 0.6 |
|  | Relationship between lug groove and sipe | Lug groove and sipe are alternately arranged | Yes | Yes | Yes | Yes |
|  | Wear resistance performance |  | 102 | 102 | 102 | 102 |
|  | Wet braking performance |  | 104 | 104 | 104 | 104 |

|  |  |  | Example 50 | Example 51 | Example 52 |
|---|---|---|---|---|---|
| First intermediate land portion | Shape of sipe | Presence of bend | Yes | Yes | Yes |
|  | Arrangement of inclined portion and lug groove on vehicle outer side | Substantially parallel | Yes | Yes | Yes |
|  | Sipe width ratio | SW1/L1 | 1.0 | 1.0 | 1.0 |
|  | Chamfered portion width ratio | MW1/SW1 | 0.3 | 0.3 | 0.3 |
|  | Extension length in tire circumferential direction with respect to extension length in tire width direction | L41/SW1 | 0.3 | 0.3 | 0.3 |
|  | Extension length of chamfered portion with respect to length to bend point | MW1/WP1 | 0.7 | 0.7 | 0.7 |
|  | Extension length in tire circumferential direction with respect to extension length of chamfered portion in tire width direction | LM1/MW1 | 0.6 | 0.6 | 0.6 |
|  | Inclination angle | θa (degree) | 60 | 60 | 60 |
|  | Inclination angle | θb (degree) | 60 | 60 | 60 |
|  | Angle between first inclined portion and second inclined portion | θ1 (degree) | 120 | 120 | 120 |
|  | Extension length in tire circumferential direction with respect to extension length of lug groove in tire width direction | L44/W44 | 0.6 | 0.6 | 0.6 |
| Second intermediate land portion | Shape of sipe | Presence of bend | Yes | Yes | Yes |
|  | Sipe width ratio | SW2/L2 | 0.6 | 0.6 | 0.6 |
|  | Chamfered portion width ratio | MW2/SW2 | 0.5 | 0.5 | 0.5 |
|  | Extension length in tire circumferential direction with respect to extension length in tire width direction | L42/SW2 | 0.6 | 0.6 | 0.6 |
|  | Angle between linear portions | θ2 (degree) | 120 | 120 | 120 |
|  | Length of portion other than chamfered portion with respect to length of groove center of sipe | L420/L421 | 0.3 | 0.3 | 0.3 |
|  | Width of terminating end portion of chamfered portion with respect to width of chamfered portion at position of opening portion | W421/W422 | 0.6 | 0.6 | 0.6 |
|  | Angle of linear portion of sipe in opening portion | θ40 (degree) | 60 | 60 | 60 |
| Center land portion | Shape of sipe | Presence of bend | Yes | Yes | Yes |
|  | Sipe width ratio | SW3/L3 | 0.4 | 0.4 | 0.4 |
|  | Extension length in tire circumferential direction with respect to extension length in tire width direction | L43/SW3 | 0.4 | 0.4 | 0.4 |

TABLE 7-continued

| | | | | | |
|---|---|---|---|---|---|
| | Angle between linear portions | θ3 (degree) | 120 | 120 | 120 |
| | Angle of linear portion of sipe in opening portion | θ43 (degree) | 60 | 60 | 60 |
| Inner shoulder land portion | Extension length of sipe with respect to distance from shoulder main groove to ground contact edge | W452/W33 | 0.8 | 0.6 | 0.6 |
| | Relationship between lug groove and sipe | Lug groove and sipe are connected | Yes | Yes | Yes |
| Outer shoulder land portion | Distance from circumferential narrow groove to shoulder sipe with respect to distance from circumferential narrow groove to shoulder lug groove | W447/W442 | 0.6 | 0.3 | 0.8 |
| | Relationship between lug groove and sipe | Lug groove and sipe are alternately arranged | Yes | Yes | Yes |
| | Wear resistance performance | | 102 | 102 | 102 |
| | Wet braking performance | | 104 | 104 | 104 |

The invention claimed is:

1. A tire, comprising:

at least four main grooves provided in a tread portion;

a first intermediate land portion provided between a first main groove that is a primary main groove and a second main groove that is a secondary main groove from a vehicle outer side when mounted on a vehicle;

a first sipe provided in the first intermediate land portion and extending through the first intermediate land portion in a tire width direction; and a first lug groove provided in a land portion of the first main groove on the vehicle outer side, and opening at one end to the first main groove and terminating at the other end within the land portion of the first main groove on the vehicle outer side;

the first sipe being bent in a bent portion provided in the first intermediate land portion, the first sipe including a first inclined portion provided on one side of the bent portion in the tire width direction, inclined with respect to a tire circumferential direction, and open to the second main groove and a second inclined portion provided on the other side of the bent portion in the tire width direction, inclined with respect to the tire circumferential direction toward a side opposite to the first inclined portion, and open to the first main groove, a difference between an inclination angle of an extension line of the second inclined portion with respect to the tire circumferential direction and an inclination angle of an extension line of the groove center line of the first lug groove with respect to the tire circumferential direction being within ±10 degrees, and a ratio L41/SW1 of an extension length L41 of the first sipe in the tire circumferential direction to an extension length SW1 of the first sipe in the tire width direction being 0.2 or more and 0.4 or less.

2. The tire according to claim 1, wherein one end of the first inclined portion opens to the second main groove, the first inclined portion has a first chamfered portion provided in a portion of a side surface on the way toward the bent portion from the one end, and a ratio MW1/SW1 of an extension length MW1 of the first chamfered portion in the tire width direction to the extension length SW1 of the first sipe in the tire width direction is 0.2 or more and 0.4 or less.

3. The tire according to claim 1, comprising:

a second intermediate land portion provided between a third main groove that is a tertiary main groove and a fourth main groove that is a quaternary main groove from the vehicle outer side when mounted on the vehicle; and a second sipe provided in the second intermediate land portion and extending in the tire circumferential direction, wherein one end of the second sipe opens to the fourth main groove, and the other end of the second sipe terminates in the second intermediate land portion, the second sipe is bent on the way toward the other end from the one end, and the second sipe has a second chamfered portion provided in a portion of a side surface on the way toward the other end from the one end.

4. The tire according to claim 3, wherein a ratio SW2/L2 of an extension length SW2 of the second sipe in the tire width direction to a land portion width L2 of the second intermediate land portion is 0.5 or more and 0.7 or less.

5. The tire according to claim 3, wherein a ratio MW2/SW2 of an extension length MW2 of the second chamfered portion in the tire width direction to an extension length SW2 of the second sipe in the tire width direction is 0.4 or more and 0.6 or less.

6. The tire according to claim 3, comprising:

a third intermediate land portion provided between the second main groove that is the secondary main groove and the third main groove that is the tertiary main groove from the vehicle outer side when mounted on the vehicle;

a third sipe provided in the third intermediate land portion and extending in the tire circumferential direction, wherein a ratio SW1/L1 of the extension length SW1 of the first sipe in the tire width direction to a land portion width L1 of the first intermediate land portion L1, a ratio SW2/L2 of an extension length SW2 of the second sipe in the tire width direction to a land portion width L2 of the second intermediate land portion, and a ratio SW3/L3 of an extension length SW3 of the third sipe in the tire width direction to a land portion width L3 of the third intermediate land portion satisfy a relationship of the ratio SW1/L1>the ratio SW2/L2>the ratio SW3/L3.

7. The tire according to claim 1, comprising:

a third intermediate land portion provided between a second main groove that is a secondary main groove and a third main groove that is a tertiary main groove from the vehicle outer side when mounted on the vehicle; and a third sipe provided in the third intermediate land portion and extending in the tire circumferential direction, wherein one end of the third sipe opens to the third main groove, and the other end of the third sipe terminates in the third intermediate land portion, the third sipe is bent on the way toward the other end from the one end, and the third sipe has a second chamfered portion on both side surfaces on the way toward the other end from the one end.

8. The tire according to claim 7, wherein a ratio SW3/L3 of an extension length SW3 of the third sipe in the tire width direction to a land portion width L3 of the third intermediate land portion is 0.3 or more and 0.5 or less.

9. The tire according to claim 1, comprising:

an inner shoulder land portion provided on a vehicle inner side of a fourth main groove that is a quaternary main groove from the vehicle outer side when mounted on the vehicle;

an inner shoulder lug groove provided in the inner shoulder land portion and extending in the tire width direction; and an inner shoulder sipe having one end connected to the inner shoulder lug groove and the other end connected to the fourth main groove.

10. The tire according to claim 9, wherein the inner shoulder lug groove has a bent portion at a position on the vehicle inner side of a connection portion with the inner shoulder lug groove, and an extension direction of a portion of the inner shoulder lug groove on the vehicle inner side of the bent portion is different from an extension direction of the inner shoulder sipe.

11. The tire according to claim 9, comprising a dimple provided on an outer side in the tire width direction of a ground contact edge of the inner shoulder land portion.

12. The tire according to claim 1, comprising:

an outer shoulder land portion provided on the vehicle outer side of the first main groove that is a primary main groove from the vehicle outer side when mounted on the vehicle;

an outer shoulder lug groove provided in the outer shoulder land portion, extending in the tire width direction, and having one end terminating at the outer shoulder land portion; and an outer shoulder sipe provided in the outer shoulder land portion, extending in the tire width direction, and having one end terminating at the outer shoulder land portion.

13. The tire according to claim 12, wherein the outer shoulder lug groove and the outer shoulder sipe are alternately provided in the tire circumferential direction.

14. The tire according to claim 12, comprising a dimple provided on an outer side in the tire width direction of a ground contact edge of the outer shoulder land portion.

15. The tire according to claim 1, comprising a mounting direction indicator configured to indicate that the tire is mounted on the vehicle such that a vehicle inner side region when mounted on the vehicle is placed on an inner side in the vehicle width direction.

16. A tire, comprising:

at least four main grooves provided in a tread portion;

a first intermediate land portion provided between a first main groove that is a primary main groove and a second main groove that is a secondary main groove from a vehicle outer side when mounted on a vehicle;

a first sipe provided in the first intermediate land portion and extending through the first intermediate land portion in a tire width direction; and a first lug groove provided in a land portion of the first main groove on the vehicle outer side and open to the first main groove;

the first sipe being bent in a bent portion provided in the first intermediate land portion, the first sipe including a first inclined portion provided on one side of the bent portion in the tire width direction, inclined with respect to a tire circumferential direction, and open to the second main groove and a second inclined portion provided on the other side of the bent portion in the tire width direction, inclined with respect to the tire circumferential direction toward a side opposite to the first inclined portion, and open to the first main groove, a difference between an inclination angle of an extension line of the second inclined portion with respect to the tire circumferential direction and an inclination angle of an extension line of the groove center line of the first lug groove with respect to the tire circumferential direction being within ±10 degrees, and a ratio L41/SW1 of an extension length L41 of the first sipe in the tire circumferential direction to an extension length SW1 of the first sipe in the tire width direction being 0.2 or more and 0.4 or less.

17. A tire, comprising:

at least four main grooves provided in a tread portion;

a first intermediate land portion provided between a first main groove that is a primary main groove and a second main groove that is a secondary main groove from a vehicle outer side when mounted on a vehicle;

a first sipe provided in the first intermediate land portion and extending through the first intermediate land portion in a tire width direction; and a first lug groove provided in a land portion of the first main groove on the vehicle outer side and open to the first main groove;

the first sipe being bent in a bent portion provided in the first intermediate land portion, the first sipe including a first inclined portion provided on one side of the bent portion in the tire width direction, inclined with respect to a tire circumferential direction, and open to the second main groove and a second inclined portion provided on the other side of the bent portion in the tire width direction, inclined with respect to the tire circumferential direction toward a side opposite to the first inclined portion, and open to the first main groove, a difference between an inclination angle of an extension line of the second inclined portion with respect to the tire circumferential direction and an inclination angle of an extension line of the groove center line of the first lug groove with respect to the tire circumferential direction being within ±10 degrees, the land portion of the first main groove on the vehicle outer side comprising a circumferential narrow groove that continuously extends in the tire circumferential direction without intersecting the first lug groove, and a ratio L41/SW1 of an extension length L41 of the first sipe in the tire circumferential direction to an extension length SW1 of the first sipe in the tire width direction being 0.2 or more and 0.4 or less.

* * * * *